(12) United States Patent
Kinoshita et al.

(10) Patent No.: US 7,231,148 B2
(45) Date of Patent: Jun. 12, 2007

(54) FLEXIBLE OPEN RING OPTICAL NETWORK AND METHOD

(75) Inventors: Susumu Kinoshita, Plano, TX (US); Koji Takeguchi, Richardson, TX (US); Satoru Odate, Richardson, TX (US); Cechan Tian, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 10/112,022

(22) Filed: Mar. 28, 2002

(65) Prior Publication Data

US 2004/0208506 A1    Oct. 21, 2004

(51) Int. Cl.
*H04J 14/00* (2006.01)
*H04J 14/02* (2006.01)

(52) U.S. Cl. ............... 398/83; 398/3; 398/4; 398/59

(58) Field of Classification Search ............... 398/1, 398/3, 4, 59, 83
See application file for complete search history.

(56) References Cited

U.S. PATENT DOCUMENTS

| | | | |
|---|---|---|---|
| 5,323,258 A | 6/1994 | Tsushima et al. | 359/190 |
| 5,483,372 A | 1/1996 | Green, Jr. | 359/173 |
| 5,510,920 A | 4/1996 | Ota | 359/121 |
| 5,550,818 A | 8/1996 | Brackett et al. | 370/60 |
| 5,576,875 A | 11/1996 | Chawki et al. | 359/125 |
| 5,680,235 A | 10/1997 | Johansson | 359/110 |
| 5,748,811 A | 5/1998 | Amersfoort et al. | 385/15 |
| 5,771,112 A | 6/1998 | Hamel et al. | 359/128 |
| 5,774,606 A | 6/1998 | de Barros et al. | 385/24 |
| 5,778,118 A | 7/1998 | Sridhar | 385/24 |
| 5,903,371 A | 5/1999 | Arecco et al. | 359/119 |
| 5,905,838 A | 5/1999 | Judy et al. | 385/123 |

(Continued)

FOREIGN PATENT DOCUMENTS

EP          1 006 688 A2       6/1900

(Continued)

OTHER PUBLICATIONS

Communication from the European Patent Office, European Search Report for Application No. EP 03 00 6739, Mar. 2, 2006, 5 pages.

(Continued)

*Primary Examiner*—Dalzid Singh
(74) *Attorney, Agent, or Firm*—Baker Botts L.L.P.

(57) ABSTRACT

A flexible open ring optical network includes a plurality of nodes connected by twin or other suitable optical rings. Each node is operable to passively add and passively drop traffic from the rings. The nodes may include a transport element for each ring. The transport elements include an optical splitter element and an optical combiner element. The optical splitter element is operable to passively combine an add signal including local add traffic and a first transport signal including ingress traffic from a coupled optical ring to generate a second transport signal including egress traffic for transmission on the coupled optical ring. The optical combiner element is coupled to the optical splitter element and is operable to passively split a third transport signal including the ingress traffic to generate a drop signal including local drop traffic and a fourth transport signal including the ingress traffic. Protection switching may be provided by selectively openable switches disposed in and distributed around the rings.

28 Claims, 18 Drawing Sheets

U.S. PATENT DOCUMENTS

| | | | | |
|---|---|---|---|---|
| 5,956,319 | A | 9/1999 | Meli | 370/224 |
| 5,959,749 | A | 9/1999 | Danagher et al. | 359/124 |
| 5,999,291 | A | 12/1999 | Anderson | 359/133 |
| 6,025,941 | A | 2/2000 | Srivastava et al. | 359/119 |
| 6,028,898 | A | 2/2000 | Sparks et al. | 375/317 |
| 6,038,357 | A | 3/2000 | Pan | 385/24 |
| 6,040,933 | A | 3/2000 | Khaleghi et al. | 359/124 |
| 6,101,012 | A | 8/2000 | Danagher et al. | 359/127 |
| 6,115,154 | A * | 9/2000 | Antoniades et al. | 398/4 |
| 6,115,156 | A | 9/2000 | Otani et al. | 359/124 |
| 6,125,220 | A | 9/2000 | Copner et al. | 385/27 |
| 6,151,356 | A | 11/2000 | Spagnoletti et al. | 375/226 |
| 6,160,648 | A | 12/2000 | Öberg et al. | 359/110 |
| 6,160,660 | A | 12/2000 | Aina et al. | 359/341 |
| 6,163,527 | A | 12/2000 | Ester et al. | 370/228 |
| 6,166,838 | A | 12/2000 | Liu et al. | 359/128 |
| 6,172,801 | B1 | 1/2001 | Takeda et al. | 359/337 |
| 6,181,849 | B1 | 1/2001 | Lin et al. | 385/24 |
| 6,188,816 | B1 | 2/2001 | Solheim | 385/24 |
| 6,192,172 | B1 | 2/2001 | Fatehi et al. | 385/17 |
| 6,192,173 | B1 | 2/2001 | Solheim et al. | 385/24 |
| 6,195,186 | B1 * | 2/2001 | Asahi | 398/5 |
| 6,201,909 | B1 | 3/2001 | Kewitsch et al. | 385/37 |
| 6,205,158 | B1 | 3/2001 | Martin et al. | 370/541 |
| 6,208,440 | B1 | 3/2001 | Jang | 359/127 |
| 6,222,654 | B1 | 4/2001 | Frigo | 359/119 |
| 6,226,117 | B1 | 5/2001 | Hentschel | 359/337 |
| 6,236,499 | B1 | 5/2001 | Berg et al. | 359/341 |
| 6,243,517 | B1 | 6/2001 | Deacon | 385/50 |
| 6,249,510 | B1 | 6/2001 | Thompson | 370/223 |
| 6,268,951 | B1 | 7/2001 | Chen et al. | 359/279 |
| 6,275,331 | B1 | 8/2001 | Jones et al. | 359/341.44 |
| 6,278,818 | B1 | 8/2001 | Laming et al. | 385/37 |
| 6,285,479 | B1 | 9/2001 | Okazaki et al. | 359/124 |
| 6,288,834 | B1 | 9/2001 | Sugaya et al. | 359/341.1 |
| 6,298,038 | B1 | 10/2001 | Martin et al. | 370/216 |
| 6,331,906 | B1 | 12/2001 | Sharma et al. | 359/119 |
| 6,337,755 | B1 | 1/2002 | Cao | 359/176 |
| 6,400,476 | B1 | 6/2002 | Arecco | 359/110 |
| 6,434,288 | B1 * | 8/2002 | Uemura et al. | 385/16 |
| 6,445,850 | B1 | 9/2002 | Zhou et al. | 385/24 |
| 6,456,406 | B1 | 9/2002 | Arecco et al. | 359/119 |
| 6,456,407 | B1 | 9/2002 | Tammela et al. | 359/119 |
| 6,519,064 | B1 | 2/2003 | Fatehi et al. | 359/130 |
| 6,529,303 | B1 | 3/2003 | Rowan et al. | 359/128 |
| 6,532,102 | B2 | 3/2003 | Kobayashi et al. | 359/334 |
| 6,590,681 | B1 | 7/2003 | Egnell et al. | 359/127 |
| 6,657,952 | B1 * | 12/2003 | Shiragaki et al. | 370/223 |
| 2002/0067523 | A1 * | 6/2002 | Way | 359/119 |
| 2002/0145779 | A1 | 10/2002 | Strasser et al. | 359/124 |
| 2002/0149817 | A1 | 10/2002 | Kiliccote et al. | 359/119 |
| 2003/0025961 | A1 | 2/2003 | Way | 359/119 |
| 2004/0114927 | A1 | 6/2004 | Fielding et al. | 398/59 |

FOREIGN PATENT DOCUMENTS

| | | |
|---|---|---|
| EP | 0 848 514 A2 | 6/1998 |
| EP | 0 855 814 A2 | 7/1998 |
| EP | 0 920 153 A2 | 6/1999 |
| EP | 0 949 777 A2 | 10/1999 |
| EP | 1 014 613 A2 | 6/2000 |
| WO | WO 96/32787 | 10/1995 |
| WO | WO 97/01907 | 1/1997 |
| WO | WO 98/47255 | 10/1998 |
| WO | WO 98/52314 | 11/1998 |
| WO | WO 99/03230 | 1/1999 |
| WO | WO 99/03231 | 1/1999 |
| WO | 99/65164 | 12/1999 |
| WO | WO 99/65164 | 12/1999 |
| WO | WO 01/17151 A1 | 3/2001 |

OTHER PUBLICATIONS

Johansson et al., "Flexible Bus: A Self-Restoring Optical ADM Ring Architecture," Electronics Letters, IEE Stevenage, GB, vol. 32, No. 25, Dec. 5, 1996, pp. 2338-2339, XP006006086.

Communication from the European Patent Office, European Search Report for Application No. EP 03 00 6220, Feb. 15, 2006, 4 pages.

Written Opinion for PCT US01/11203, (4 pages), Nov. 12, 2003.

Bellcore, "*SONET Bidirectional Line-Switched Ring Equipment Generic Criteria*,", A Module of TSGR, RF-440, Generic Requirements, GR-1230-Core, Issue 4, Dec. 1998 (274 pages).

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Wolde, J., et al., "Optical Ethernet Metro Access Network Protype: Implementation and Results," ECOC-IOOC 2003, 3 pages, Sep. 21-25, 2003.

PCT, Notification of Transmittal of the International Search Report or the Declaration, International Application No. PCT/US03/15649, 7 pages, Feb. 3, 2004.

Vasilyev et al., 80x10.7 Gb/s Ultra-Long-Haul (+4200 km) "DWDM Network with Reconfigurable Broadcast & Select OADMs," OFC 2002 Postedeadline Papers, Corning, 2002.

Bacque, B. et al., "R-OADM Architecture—Now you can Control the Light," Tropic Networks, pp. 1-11, 2003.

Grenfeldt, "ERION-Ericsson optical networking using WDM technology," Ericsson Review No. 3, pp. 132-137, 1998.

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1-4, Feb. 22, 2002.

Magnus Grenfeldt, "ERION—Ericsson optical networking using WDM technology," *Ericsson Review*, No. 3, 1998, 6 pages.

Evan Goldstein, "Optical Ring Networks with Distributed Amplification," *IEEE Photonics Technology Letters*, vol. 3, No. 4, Apr. 1991, 4 pages.

Ori Gerstel of Nortel Networks, "Optical Layer Survivability," Tutorial T4, slides of OMS DPRing: Flexing Bus and Pros/Con of Flexing Bus, OptiComm 2000, *Conference on Optical Communications and Networking*, Oct. 2000, 2 pages.

Vincent W. S. Chan, Serena Chan, and Shayan Mookherjea, "Optical Distribution Networks," OptiComm 2000: Optical Networking and Communications, *Proceedings of SPIE*, vol. 4233, Oct. 2000, 12 pages.

Calvin J. Martin, Chiroll Tolliver, Jerome Case, Marcus W. Shute, Sr., and Z. Y. Gills, "A Flexible Broadband Wavelength Multiplexer," *Proceedings of SPIE*, vol. 4532, 2001, 12 pages, 2000.

Shayan Mookherjea, "Remotely Pumped Optical Distribution Networks: A Distributed Amplifier Model," *Journal of Lightwave Technology*, vol. 19, No. 7, Jul. 2001, 7 pages.

Vincent W. S. Chan and Serena Chan, "Optical distribution networks," *Optical Networks Magazine*, Jan./Feb. 2002, 9 pages.

Rob Batchellor, "Optical Networking the Ericsson Way," *Ericsson Limited, Business Unit Transport and Cable Networks*, Feb. 22, 2002, 4 pages.

* cited by examiner

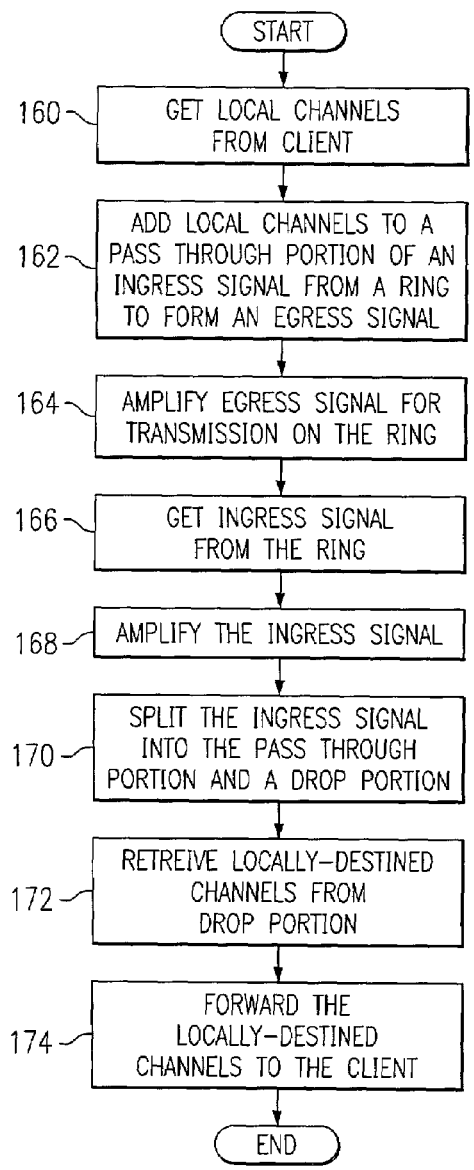
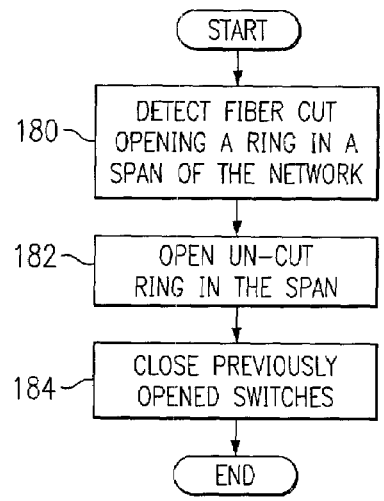
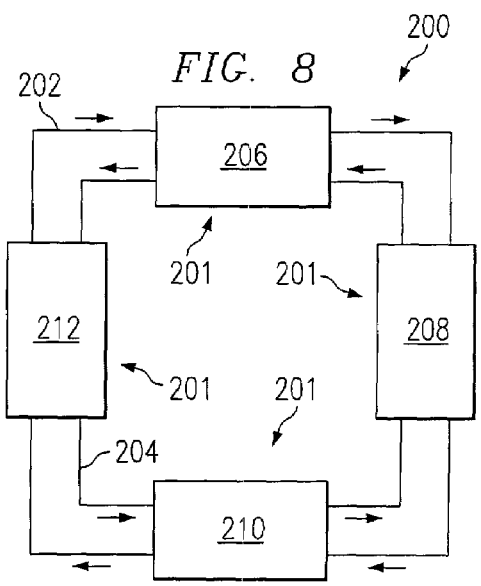

FLEXIBLE OPEN RING OPTICAL NETWORK AND METHOD

TECHNICAL FIELD OF THE INVENTION

The present invention relates generally to optical transport systems, and more particularly to a flexible open ring optical network and method.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. Arrayed waveguide gratings (AWGs), interleavers, and/or fiber gratings (FGs) are typically used to add and/or drop traffic at the multiplex and demultiplex network nodes.

SUMMARY OF THE INVENTION

The present invention provides a protectable optical network that passively adds and drops traffic to and from the optical rings. As a result, channel spacing restrictions may be eliminated in the rings and set only by local send and receive components passively coupled to the rings.

In accordance with one embodiment of the present invention, an optical network includes a plurality of nodes connected by twin optical rings. Each node is operable to passively add and passively drop traffic from the rings. In a particular embodiment, an optical switch may be connected within each ring and be operable to selectively open and close a connected ring. A network management system may close the ring at a point of a switch in response to at least an opening at another point in the ring. In this embodiment, the network management system may open the other ring at a point corresponding to the other point and close the other ring at a previously opened point.

In accordance with another aspect of the present invention, a node for an open ring optical network may include a first transport element operable to be coupled to a first optical ring transporting traffic in a first direction and a second transport element operable to be coupled to a second optical ring transporting traffic in a second, disparate direction. The first and second transport elements may each include an optical combiner element in an optical splitter element. The optical combiner element may passively combine and add signals including local add traffic and a first transport signal including ingress traffic from a coupled optical ring to generate a second transport signal including egress traffic for transmission on the optical ring. The optical splitter element may be coupled to the optical combiner element and operable to passively split a third transport signal including the ingress traffic to generate a drop signal including local drop traffic and a fourth transport signal including the ingress traffic. In a particular embodiment, a single optical splitter may include the optical splitter element and the optical combiner element integrated together. In this embodiment, the third transport signal and the second transport signal are intermediate signals in the optical splitter. And in another embodiment, the optical splitter element and the optical combiner element may each be a distinct optical splitter.

In accordance with still another aspect of the present invention an optical network may include a plurality of nodes with a first ring and a second ring connecting the nodes. The first ring may be operable to transport traffic in a first direction and a second ring operable to transport traffic in a second, disparate direction. The nodes may each include a first transport element coupled to the first ring and a second transport element coupled to the second ring. The transport elements may each include an optical splitter unit operable to add local traffic to the coupled ring and to drop local traffic from the coupled ring. A plurality of optical switches are disposed in and distributed around each ring. The optical switches are operable to open a connected ring at the point of the switch to provide protection switching. In a particular embodiment, the optical switches are each disposed between optical splitter elements of neighboring nodes. The nodes may further include combining, distributing and managing elements. The combining element may be a combining amplifier using an optical splitter. The distributing element may be a distributing amplifier also using an optical splitter. The managing element may communicate with a network management system which may selectively actuate corresponding sets of optical switches through managing elements to implement protection switching in response to a network failure. The network failure may be a ring cut, a component failure and the like.

In accordance with yet another aspect of the present invention, protection switching for an open ring network may be provided by detecting a failure at a failure point of a first ring, opening a second ring at a corresponding point, and closing a remainder of the first ring and of the second ring.

Technical advantages of the present invention include providing an improved optical network. In a particular embodiment, traffic is added and/or dropped to and from protected transport rings at the network nodes using passive optical splitters. As a result, channel spacing in the ring is flexible. Accordingly, the network is operable to accommodate various date-rate services (150 Mb/s, 600 Mb/s, 2.4 Gb/s, 10 Gb/s, and 40 Gb/s) and various modulation schemes (direct modulation and external modulation) with minimal reconfiguration.

Another technical advantage of the present invention includes providing fault tolerance for a flexible ring optical network. In a particular embodiment, an open ring architecture is employed with the open point being configurable. For example, optical switches may be disposed in and around the optical rings to allow the open point in the rings to be aligned with each other and with a line cut or other failure.

Still another technical advantage of the present invention includes providing a flexible open ring network without need of a specially configured central, command, or hub node to provide for monitoring, control and fast protection switching. In one embodiment, all nodes in the network may be similarly configured with the same type of elements to minimize engineering, production, and maintenance costs of the network nodes.

Still another technical advantage of the present invention includes providing a flexible ring optical network supporting an optical supervisory channel (OSC). The OSC may be dropped, processed, and added via the nodes. In addition, the OSC may be transmitted around the network rings in-band or out-of-band and protected in either embodiment.

Still another technical advantage of the present invention includes providing node and/or component isolation, loop-back and testing features for an open ring network. In a particular embodiment, optical and/or electric loopbacks within the nodes may be configured so as to facilitate protection switching, testing, and insertion of new or replacement nodes or elements. Thus, the elements and functionality of the network can be tested as well as unit operation and/or fiber connections. In addition, areas of the network may be localized from the in-service network and tested.

Other technical advantages of the present invention include providing a highly scalable and modular optical network with many node configuration options suitable for a pay-as-you-grow strategy. For example, passive nodes with no switching elements and/or no ring switching elements may be added along the network at add/drop points with low traffic flow and/or low priority traffic. New nodes may be inserted into the networks with minimum disruption of the in-service network.

It will be understood that the various embodiments of the present invention may include some, all, or none of the enumerated technical advantages. In addition, other technical advantages of the present invention may be readily apparent from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 6 is a flow diagram illustrating a method for passively adding and dropping traffic in an optical network in accordance with one embodiment of the present invention;

FIG. 7 is a flow diagram illustrating a method for protection switching for an open ring photonic network in accordance with one embodiment of the present invention;

FIG. 8 is a block diagram illustrating an optical network in accordance with another embodiment of the present invention;

DETAILED DESCRIPTION OF THE INVENTION

Figure 1:
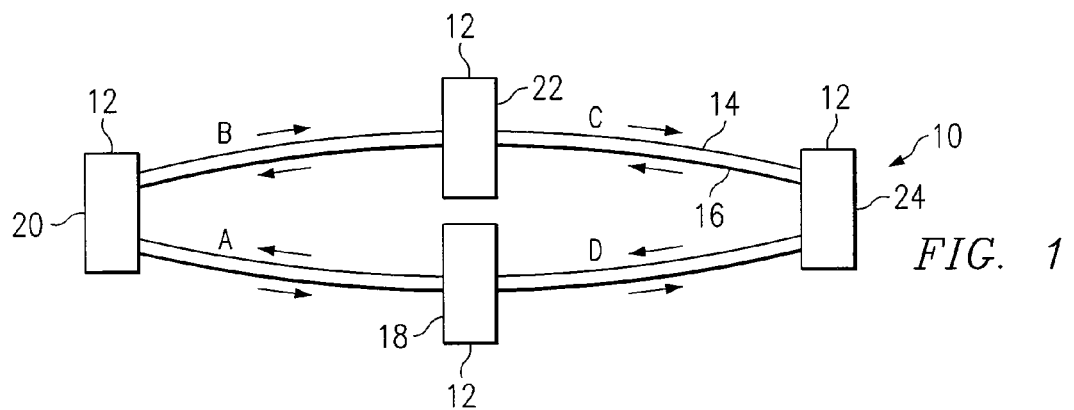
FIG. 1 is a block diagram illustrating an optical network in accordance with one embodiment of the present invention.

FIG. 1 illustrates an optical network 10 in accordance with one embodiment of the present invention. In this embodiment, the network 10 is an optical network in which a number of optical channels are carried over a common path at disparate wavelengths. The network 10 may be a wavelength division multiplexing (WDM), dense wavelength division multiplexing (DWDM), or other suitable multi-channel network. The network 10 may be used in a short-haul metropolitan network, and long-haul inter-city network or any other suitable network or combination of networks.

Referring to FIG. 1, the network 10 includes a plurality of nodes 12, a first fiber optic ring 14, and a second fiber optic ring 16. Optical information signals are transmitted in different directions on the rings 14 and 16 to provide fault tolerance. Thus each node both transmits traffic to and receives traffic from each neighboring node. As used herein, the term "each" means every one of at least a subset of the identified items. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 14 is a clockwise ring in which traffic is transmitted in a clockwise direction. The second ring 16 is a counterclockwise ring in which traffic is transmitted in a counterclockwise direction. Span A comprises the portion of the clockwise ring 14 and counterclockwise ring 16 between node 18 and node 20. Span B comprises the portion of the clockwise ring 14 and the counterclockwise ring 16 between node 20 and node 22. Span C comprises the portion of the clockwise ring 14 and the counterclockwise ring 16 between nodes 22 and 24. Span D comprises the portion of the clockwise ring 14 and the counterclockwise ring 16 between node 24 and node 18.

The nodes 12 are operable to add and drop traffic to and from the rings 14 and 16. At each node 12, traffic received from local clients is added to the rings 14 and 16 while traffic destined for local clients is dropped. Traffic may be added to the rings 14 and 16 by inserting the traffic channels or otherwise combining signals of the channels into a transport signal of which at least a portion is transmitted on one or both rings 14 and 16. Traffic may be dropped from the rings 14 and 16 by making the traffic available for transmission to the local clients. Thus, traffic may be dropped and yet continue to circulate on a ring 14 and 16. In a particular embodiment, traffic is passively added to and dropped from the rings 14 and 16. "Passive" in this context means the adding or dropping of channels without power, electricity, and/or moving parts. An active device would thus use power, electricity or moving parts to perform work. In a particular embodiment, traffic may be passively added to and/or dropped from the ring 14 and 16 by splitting/combining, which is without multiplexing/demultiplexing, in the transport rings and/or separating parts of a signal in the ring.

In one embodiment, the nodes 12 are further operable to multiplex data from clients for adding to the rings 14 and 16 and to demultiplex channels of data from the rings 14 and 16 for clients. In this embodiment, the nodes 12 may also perform optical to electrical conversion of the signals received from and sent to the clients.

In addition, as described in more detail below, rings 14 and 16 each have termini in one of the nodes 12, such that the rings 14 and 16 are "open" rings. That is, the rings 14 and 16 do not form a continuous transmission path around network 10 such that traffic does not continue and/or include an obstruction on a ring past a full circuit of the network 10. The opening in the rings 14 and 16 terminates, and thus removes channels at the terminal points. Thus, after traffic of a channel is transmitted to each node 12 in the clockwise and/or counterclockwise rings 14 and 16 by the combined nodes 12, the traffic is removed from the rings 14 and 16. This prevents interference of each channel with itself.

In a particular embodiment and as described further below, signal information such as wavelengths, power and quality parameters are monitored in the nodes 12 and/or by a control system. Based on this information, the network 10 is alert to line cuts and other faults and is able to perform protection switching. Thus, the nodes 12 provide for circuit protection in the event of a line cut in one or both of the rings 14 and 16.

Total lambda of the network 10 may be divided and assigned to each node 12 depending on the local or other traffic of the nodes 12. For an embodiment in which the total lambda is forty and total number of nodes 12 is four and the node traffic is even in each node 12, then ten lambda may be assigned to each node 12. If each lambda is modulated by 10 Gb/s data-rate, each note can send 100 Gb/s (10 Gb/s×10 lambda) to all nodes in the network 10. For a DWDM system, the lambda may be between 1530 nm and 1565 nm. The channel spacing may be 100 GHz or 0.8 nm, but may be suitably varied. In addition, channel spacing is flexible in the rings 14 and 16 and the node elements on the rings 14 and 16 need not be configured with channel spacing. Instead, for example, channel spacing may be set up by add/drop receivers and transmitters that communicate with and/or are coupled to the clients. The rings 14 and 16 add, drop and communicate traffic independently of and/or regardless of the channel spacing of the traffic.

Figure 2:
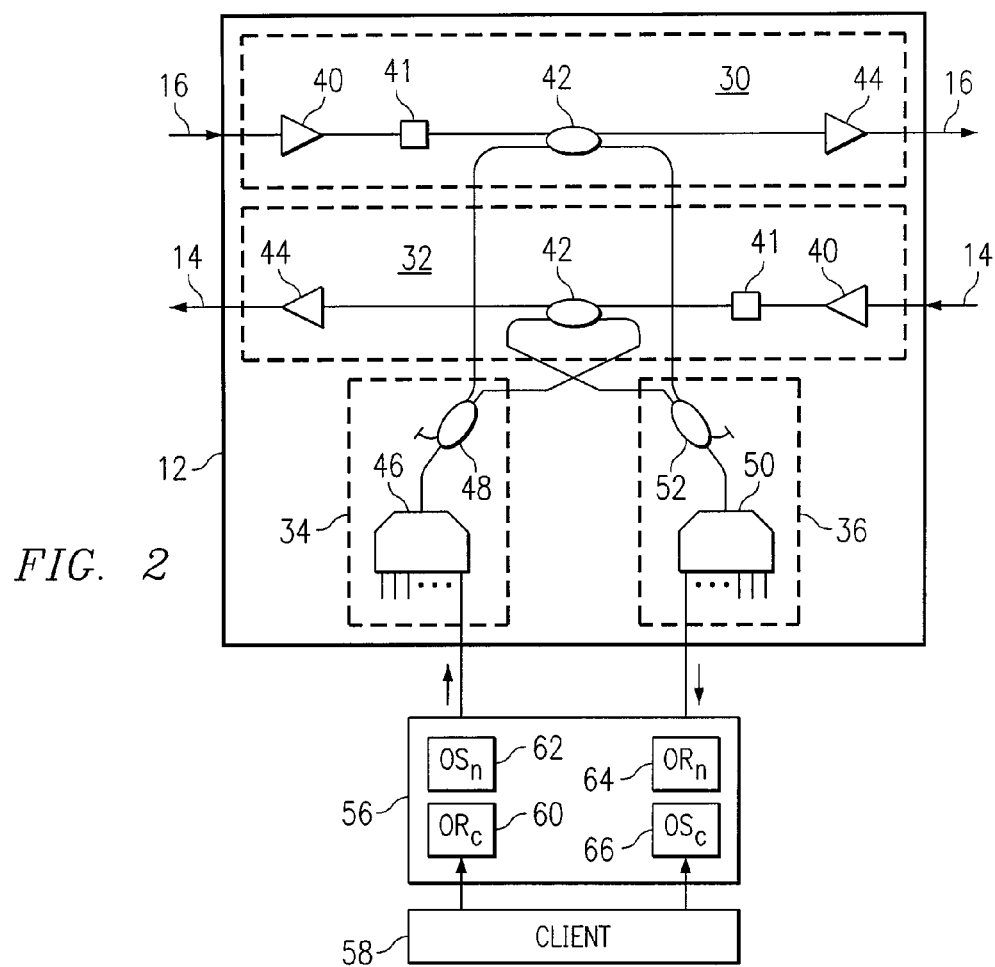
FIG. 2 is a block diagram illustrating details of the node of the optical network of FIG. 1 in accordance with one embodiment of the present invention.

FIG. 2 illustrates details of the node 12 in accordance with one embodiment of the present invention. In this embodiment, traffic is passively added to and dropped from rings 14 and 16 by optical couplers or other suitable optical splitters. An optical splitter is any device operable to combine or otherwise passively generate a combined optical signal based on two or more optical signals without multiplexing and/or to split or divide an optical signal into discrete optical signals or otherwise passively generate discrete optical signals based on the optical signal without demultiplexing. The discrete signals may be similar or identical in form and/or content. For example, the discrete signals may be identical in content and identical or substantially similar in energy, may be identical in content and differ substantially in energy, or may differ slightly or otherwise in content.

Referring to FIG. 2, the node 12 comprises a first, or counterclockwise transport element 30, a second, or clockwise transport element 32, a combining element 34 and a distributing element 36. The transport elements 30 and 32 each passively add and drop traffic to and from the rings 14 and 16 without multiplexing or demultiplexing or signals on the ring and/or provide other interaction of the node 12 with the ring. The combining element 34 generates the local add signal passively or otherwise. The distributing element 36 distributes the drop signals into discrete signals for recovery of local drop traffic passively or otherwise. In a particular embodiment, the transport, combining and distributing elements 30, 32, 34 and 36 may each be implemented as a discrete card and interconnected through a backplane of a card shelf of the node 12. In addition, functionality of an element itself may be distributed across a plurality of discrete cards. In this way, the node 12 is modular, upgradeable, and provides a pay-as-you-grow architecture.

Each transport element 30 and 32 is connected or otherwise coupled to the corresponding ring 14 or 16 to add and drop traffic to and from the connected ring 14 or 16. Components may be coupled by direct, indirect or other suitable connection or association. In one embodiment, the transport elements 30 and 32 each include an ingress amplifier 40, a ring protection switch 41, an optical splitter 42, and an egress amplifier 44. In the illustrated embodiment, the elements of the node 12 and devices in the elements are connected with optical fiber connections, however, other embodiments may be implemented in part or otherwise with planar wave guide circuits and/or free space optics.

The ingress and egress amplifiers 40 and 44 may be erbium-doped fiber amplifier (EDFAs) or other suitable amplifiers capable of receiving and amplifying an optical signal. The output of the amplifier may be, for example, 5 dBm. As the span loss of clockwise ring 14 usually differs from the span loss of counterclockwise ring 16, egress amplifier 40 may use an automatic level control (ALC) function with wide input dynamic-range. Hence, the ingress amplifier 40 may deploy automatic gain control (AGC) to realize gain-flatness against input power variation as well as variable optical attenuators (VOAs) to realize ALC function. In a particular embodiment, the amplifier 40 may be gain variable amplifiers, such as, for example, as described in U.S. Pat. No. 6,055,092.

The ring protection switch 41 is a two position or other suitable switch or device operable to selecting open or close the connected ring at the node 12. The optical splitter units 42 may each be an optical fiber coupler or other optical splitter operable to combine and/or split an optical signal. Details of the optical coupler are described in more detail in connection with FIG. 3.

In operation of the transport elements, the ingress amplifier 40 receives an ingress transport signal from the connected ring 14 or 16 and amplifies the signal. Protection switches 41 allow the network 10 to reconfigure traffic flow in response to a line cut or other fault to provide fault tolerance. The amplified signal is passed to the optical coupler 42. The optical coupler 42 combines the amplified ingress signal with a local add signal from the combining element 34 to generate a combined signal. The optical coupler 42 further splits the combined signal into an egress transport signal for transmission on the connected ring 14 or 16 and a local drop signal from the ring 14 or 16. The local drop signal is passed to the distributing element 36 for processing. In this way, for example, traffic is passively added to and dropped from the ring 14 or 16 in the node 12.

The combining element 34 includes a multiplexer 46 and an optical coupler 48. The multiplexer 46 multiplexes a plurality of local signals to generate the local add signal. The optical coupler 48 splits the local add signal into two generally content-identical local add signals, one of which is passed to each transport element 30 and 32. The multiplexer may be an arrayed wave guide (AWG).

The distributing element 36 includes a demultiplexer 50 and an optical coupler 52. The optical coupler 52 combines the local drop signals of each ring 14 and 16 provided by the transport elements 30 and 32 to generate a local drop signal for the node 12. The local drop signal is demultiplexed by demultiplexer 50 after which the discrete signals may be filtered and distributed.

A transponder 56 may be connected between the node 12 and a client or set of clients 58. In the metro environment, the client 58 may be a corporate campus, industrial complex, large building, set of buildings, a city block, a neighborhood and the like. For the long haul environment, the client may be a town, small city or geographic region.

The transponder 56 includes optical receivers 60 and optical senders 62 operable to receive an optical signal from the client 58, change the wavelength of the signal as necessary to avoid interference in network 10, and send the optical signal to the multiplexer 46 of the combining element 34 over an optical link. The transponder 56 also includes optical receiver 64 and optical sender 66 operable to receive a selected demultiplexed channel from the demultiplexer 50 of the distributor element 36 over an optical link, change the wavelength as necessary to avoid interference in the client's network, and send the optical signal to the client 58. In changing the wavelength, the transponder 56 may convert the signal from an optical format to a non-optical format and back into the optical format.

Use of the transponder 56 allows the network 10 and client network to independently set wavelengths for traffic flow. Client 58 may directly connect to the node 12 without transponder 56 when client 57 has a suitable interface to the node 12. To enhance flexibility, the optical receivers 60 and 64 may include tunable filters and the optical senders 62 and 64 may include wavelength tunable filters while the optical senders 62 and 66 include wavelength tunable lasers. In this embodiment, a light path may be established between two nodes 12 by setting a laser of one of one of the optical senders in the transmitting node to a specified frequency and correspondingly setting to the specified frequency a filter of an optical receiver in the receiving node. No other configuration is necessary in the network 10 as the traffic channel may be passively combined with and separated from other traffic and is passively added to and dropped from the rings 14 and 16. It will be understood that optical senders with fixed lasers and optical receivers with fixed filters may be used in connection with the present invention and that non-passive combining and distributing elements 36 and 34 may also be used.

Figure 3:
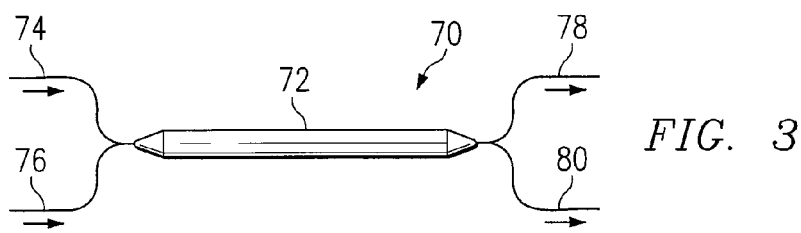
FIG. 3 is a block diagram illustrating details of an optical coupler in accordance with one embodiment of the present invention.

FIG. 3 illustrates details of an optical coupler 70 in accordance with one embodiment of the present invention. In the embodiment, the optical coupler 70 is a fiber coupler with two inputs and two outputs. The optical coupler 70 may in other embodiments be combined in whole or part with a waveguide circuit and/or free space optics. It will be understood that the coupler 70 may include one or any number of any suitable inputs and outputs and that the coupler 70 may comprise a greater number of inputs than outputs or a greater number of outputs than inputs.

Referring to FIG. 3, the optical coupler 70 comprises a cover frame 72, first entry segment 74, second entry segment 76, first exit segment 78, and second exit segment 80.

First entry segment 74 and first exit segment 78 comprise a first continuous optical fiber. Second entry segment 76 and second exit segment 80 comprise a second continuous optical fiber. Outside of the main body 72, segments 74, 76, 78, and 80 may comprise a jacket, a cladding, and a core fiber. Inside the cover frame 72, the jacket and cladding may be removed and the core fibers twisted, fused, or coupled together to allow the transfer of optical signals and/or energy of the signals between and among the first and second continuous optical fibers. In this way, the optical coupler 70 passively combines optical signals arriving from entry segments 74 and 76 and passively splits and forwards the combined signal via exit segments 78 and 80. A plurality of signals may be combined and the combined signal split by combining and thereafter splitting the combined signal or by simultaneously combining and splitting the signals by transferring energy between fibers. In the later case, the optional coupler 70 includes intermediate signals.

The optical coupler 70 provides flexible channel-spacing with no restrictions concerning channel-spacing in the main streamline. The coupler 70 may split the signal into two copies with substantially equal power. "Substantially equal" in this context means ±25%. The coupler may have a directivity of over 55 dB. Wavelength dependence on the insertion loss may be less than about 0.5 dB over 100 nm. The insertion loss for a 50/50 coupler may be less than about 3.5 dB.

Figure 4:
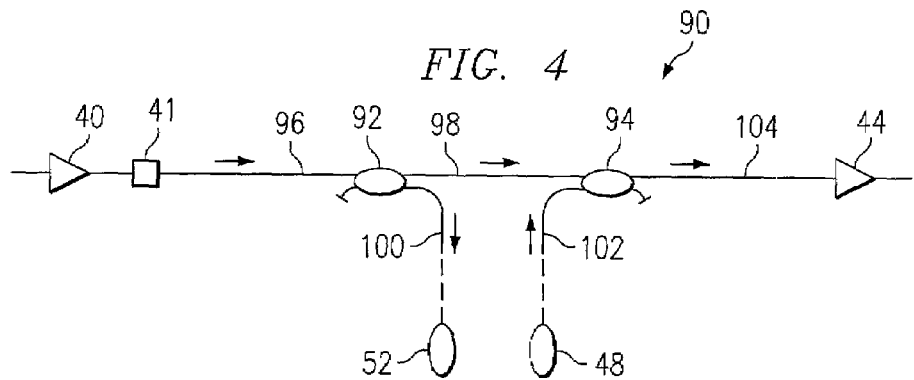
FIG. 4 is a block diagram illustrating the optical splitter unit of a transport element of FIG. 2 in accordance with another embodiment of the present invention.

FIG. 4 illustrates the optical splitter unit 42 in accordance with another embodiment of the present invention. In this embodiment, a pair of optical couplers 92 and 94 are used in each transport element 30 and 32 of node 12. Thus, the combining and splitting of signals may be performed by a single coupler with integrated optical combiner and splitter elements or a plurality of couplers each having one or a portion of the combiner or splitter elements. Although the dual coupler arrangement increases the total number of couplers in the transport elements 30 and 32, the two-coupler arrangement may reduce channel interference by dropping local traffic from a ring 14 or 16 before adding the local traffic to the ring 14 or 16.

Referring to FIG. 4, the first coupler 94 is an optical splitter element that splits an ingress transport signal 96 from the ingress amplifier 40 and ring switch 41 into a pass through transport signal 98 and a local drop signal 100. The local drop signal 100 is forwarded to the optical coupler 52 of the distributor element 36. A transport signal is a signal transmitted on one or more of the rings 14 or 16, a passthrough signal forwarded by one coupler of a transport element to another coupler of the element, an intermediate signal of a coupler of a transport element 30 or 32 and/or other non-add or non-drop signal within a process by a transport element 30 or 32.

The second optical coupler 94 is an optical combiner element that combines the pass through transport signal 98 and a local add signal 102 from the optical coupler 48 of the combining element 34. In combining the pass though transport signal 98 with the local add signal 102, the second optical coupler 94 generates an egress transport signal 104. The egress transport signal 104 is amplified by egress amplifier 44 for transmission on the connected ring 14 or 16.

Figure 5:
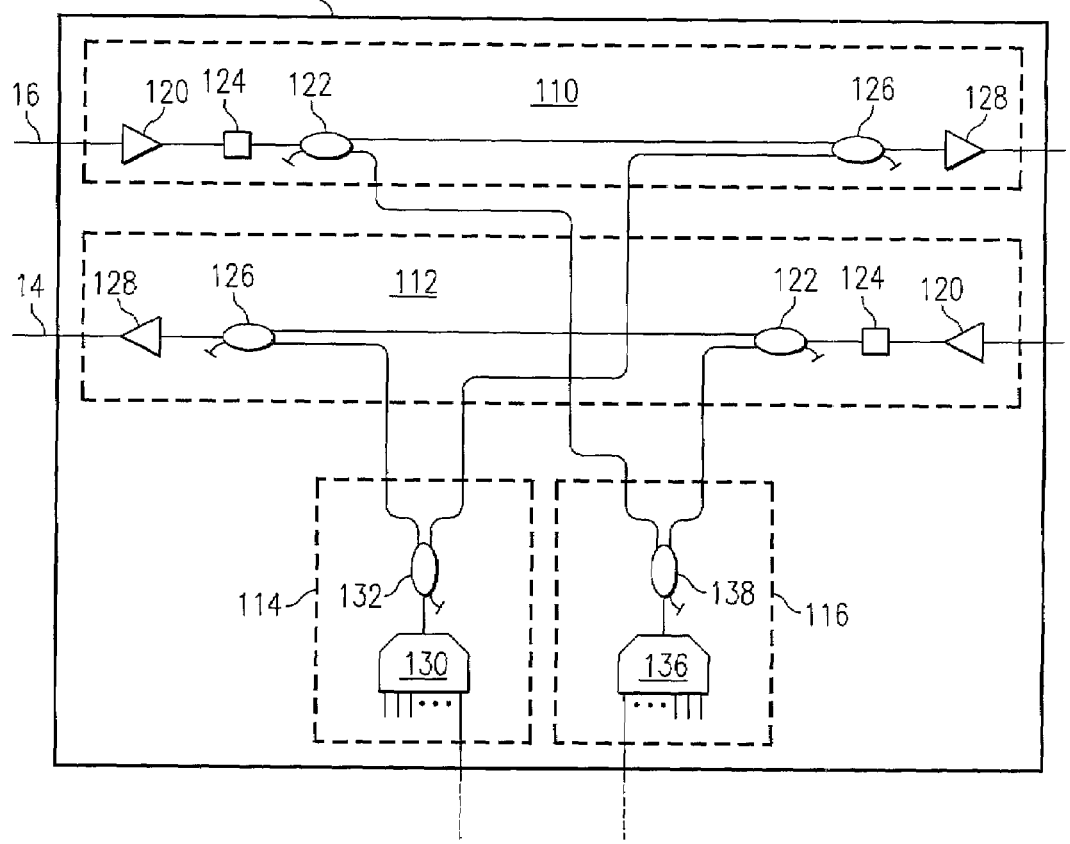
FIG. 5 is a block diagram illustrating details of the node of the optical network of FIG. 1 in accordance with another embodiment of the present invention.

FIG. 5 illustrates details of node 12 in accordance with another embodiment of the present invention. In this embodiment, the node 12 provides the add/drop features of the node 12 using separate add and drop couplers as described in connection with FIG. 4.

Referring to FIG. 5, the node 12 includes a counterclockwise transport element 110, clockwise transport element 112, a combining element 114, and a distributing element 116. The transport elements 110 and 112 are each connected to a corresponding one of the rings 14 or 16 to add and drop traffic to and from the connected ring 14 or 16.

The transport elements 110 and 112 each include an ingress amplifier 120, a drop optical coupler 122, an optical ring switch 124, an add coupler 126 and an egress amplifier 128. The ingress and egress amplifiers 120 and 128 may be EDFA or other suitable amplifiers. The drop optical coupler 122 splits an incoming signal into two outgoing signals. The optical add coupler 124 combines two incoming signals into an outgoing signal. The optical couplers 122 and 124 may be the optical coupler 70 modified with a single input or a single output.

In one embodiment, the ring switch 124 is a two position switch operable to open or close the corresponding ring 14 or 16. It will be understood that other suitable switches may be used. For example, as described in more detail below, two-by-two switches may be used to support loopback, localized and other testing in addition to providing fault tolerance for the network 10. The switches 124 may be controlled by a network management system (NMS) for network 10 or other suitable control system.

In operation of the transport elements 110 and 112, the ingress amplifier 120 receives an ingress transport signal from the connected ring and amplifies the signal. If the ring switch 124 is open, the amplified signal is terminated. Alternatively, if the ring switch 124 is closed, the amplified signal is forwarded to the drop coupler 122. The drop coupler 122 splits the amplified ingress signal into a passthrough signal and a local drop signal. The local drop signal is forwarded to the distributing element 116. The passthrough signal is passed to the add coupler 126. The add coupler 126 combines any passthrough signal with any local add signal from the combining element 114 to generate an egress transport signal. The egress transport signal is amplified by egress amplifier 128 for transmission on the connected ring 14 or 16. Thus, traffic is passively added and dropped in the node 12.

The combining element 114 includes a multiplexer 130 and an optical coupler 132 for adding signals to each of the transport elements 110 and 112. The multiplexer 130 multiplexes a plurality of local signals to generate a local add signal. The optical coupler 132 splits the local add signal into two generally content-identical add signals, one of which is allocated to each transport element 110 and 112.

The distributing element 116 includes a demultiplexer 136, an optical coupler 138. The optical coupler 138 combines the local drop signals to generate a local drop signal for the node 12. The local drop signal is demultiplexed by the demultiplexer 136. In a particular embodiment, the traffic may be transmitted to and received from a client through a transponder as previously described in connection with the node 12. A client may directly connect to the distributing element 116 without transponder 56 when the client has a suitable interface to the element 116.

An NMS or other control system may control the ring switches 41 of FIG. 2 or ring switches 124 of FIG. 5 directly or indirectly to provide protection switching. In operation, one switch is open in each ring 14 and 16 such that the rings 16 and 14 have termini at a node 12 so as to be "open". The openings in the rings are aligned with each other or otherwise correspond to each other such that they occur in a same section of the rings 14 and 16. The same section may be between add and drop couplers in a node and/or between optical splitter units of neighboring nodes. The rings 14 and 16 are twin rings when the opening rings correspond to each other. The open rings prevent any traffic from circulating beyond a complete circuit of a ring 14 or 16 and thus interfering with later transmitted traffic on the same channel.

In the event of a line cut and/or other openings of rings 14 and 16 in span A, B, C, or D of network 10, ring switches 41 of the node 12 of FIG. 2 or 124 of the node of FIG. 5 that bound the fault may be switched to the "open" position and the previously open switches may be switched to the "closed" position allowing signal traffic to pass through the previous opening on rings 14 and 16. Thus, the switches are selectively closable to provide protection switching. In this way, a line cut does not result in the isolation of a node 12 from the other nodes in the network 10. Thus, if rings 14 and 16 are elsewhere open (as in a line cut), they can be closed in the other nodes 12. In the event of a line cut in a span of only one of ring 14 or 16, the span of the non cut ring may be opened to simulate a cut at a corresponding point in the un-cut ring. Corresponding point in this context means a point in one ring corresponding to the same span as a defined point in the other ring. By opening the un-cut ring at the corresponding point as the cut in the cut ring, both rings are opened in the same span or section.

The above-described opening of the ring may be accomplished using an amplifier or other transmission device operable to selectively pass a signal through an optical fiber or effectively terminate the signal. In one embodiment, the signal is effectively terminated when the signal does not interfere with new traffic being added to the ring. Further details of protection switching are described in connection with FIG. 7.

FIG. 6 is a flow diagram illustrating a method for adding and dropping traffic channels in a flexible optical network in accordance with one embodiment of the present invention. The flexible optical network may be the open ring network of FIG. 1 or other suitable passive network.

Referring to FIG. 6, the method begins at step 160 where local channels are received from a client. As previously described, the local channels may first be processed by a transponder to prevent inter network wavelength conflicts and may be multiplexed by a multiplexer within the node 12.

At step 162, the local channels are added to a pass-through portion of an ingress signal from a ring 14 or 16 to form an egress signal. As previously described, local channels may be added to the pass-through portion of the ingress signal by an optical coupler or other suitable optical splitter. Proceeding to step 164, the egress signal is amplified for transmission on the ring 14 or 16. The signal may be amplified by an EDFA or other suitable amplifier.

Returning to the ingress signal, at step 166 the signal is obtained from the ring 14 or 16. At step 168, the ingress signal is amplified. As previously described, the amplification may be by EDFA or other suitable amplifier.

Proceeding to step 170, the ingress signal is split into the pass-through portion and a drop portion. As previously described, the ingress signal may be split by the optical coupler or other suitable passive splitter. At step 172, locally-destined channels are retrieved from the drop portion of the combined signal. As previously described, the drop portion may be demultiplexed by a demultiplexer within the node 12 or hub 18, allowing for the selection of channels for receipt by the client. At step 174, the locally-destined channels are forwarded to the client.

FIG. 7 is a flow diagram illustrating a method for protection switching of an open ring photonic network in accordance with one embodiment of the present invention. In this embodiment, NMS in the network 10 communicates with the nodes 12 to provide protection switching.

Referring to FIG. 7, the method begins at step 180 where the NMS detects a loss of signal (LOS) at a node 12 in one of the rings 14 or 16 indicating a fiber cut or other similar type of failure in one of the spans connecting the nodes 12 of the clockwise and/or counterclockwise ring 14 and 16.

At step 182, the un-cut ring in the span is opened. This may be accomplished by, in one embodiment, turning off the amplifiers adjacent to or that feed into the cut and also amplifiers at a corresponding point in the un-cut ring. In this way, a line cut in both rings 14 and 16 at the same span is simulated and the rings 14 and 16 remain open after the cut or failure is repaired. In accordance with this embodiment of the present invention, the protection switching may be accomplished in less than 50 milliseconds.

Proceeding to step 184, after both rings 14 and 16 are opened in the span of the fiber cut, previously open switches 41 or 124 in the nodes 12 are switched to the "on" position, allowing the optical signal to pass through the previous openings. In this way, ring integrity is maintained and node 12 isolation is prevented.

FIG. 8 illustrates an optical network 200 in accordance with another embodiment of the present invention. In this embodiment, the network 200 may include a plurality of nodes 201 with protection switching features integrated into the node design. As a result, only a single type of node with a same or substantially similar element configuration need be used.

Referring to FIG. 8, the network 200 includes a first fiber optic ring 202 and a second fiber optic ring 204 connecting nodes 206, 208, 210, and 212. As with network 10, network 200 is an optical network in which a number of optical channels are carried over a common path at disparate wavelengths. The network 200 may be a wavelength division multiplexing (WDM), dense wavelength division multiplexing (DWDM), or other suitable multi-channel network. The network 200 may be used in a short-haul metropolitan network, and long-haul inter-city network or any other suitable network or combination of networks.

In network 200, optical information signals are transmitted in different directions on the rings 202 and 204 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 202 is a clockwise ring in which traffic is transmitted in a clockwise direction. The second ring 204 is a counterclockwise ring in which traffic is transmitted in a counterclockwise direction. The nodes 201 are each operable to add and drop traffic to and from the rings 202 and 204. In particular, each node 201 receives traffic from local clients and adds that traffic to the rings 202 and 204. At the same time, each node 201 receives traffic from the rings 202 and 204 and drops traffic destined for the local clients. In adding and dropping traffic, the nodes 201 may multiplex data from clients for transmittal in the rings 202 and 204 and may demultiplex channels of data from the rings 202 and 204 for clients.

As previously described in connection with network 10, traffic may be added to the rings 202 and 204 by inserting the traffic channels or otherwise combining signals of the channels into a transport signal of which at least a portion is transmitted on a ring. Traffic may be dropped by making the traffic available for transmission to the local clients. Thus, traffic may be dropped and yet continue to circulate on a ring.

In a particular embodiment, traffic is passively added to and passively dropped from the rings 202 and 204. In this embodiment, channel spacing is flexible in the rings 202 and 204 and the node elements on the rings 202 and 204 need not be configured with channel spacing. Thus, channel spacing may be set by and/or at the add/drop receivers and senders of the nodes 201 coupled to the client. The transport elements of the nodes 201 communicate the received traffic on the rings 202 and 204 regardless of the channel spacing of the traffic.

Each ring 202 and 204 has a terminating point such that the rings 202 and 204 are "open" rings. The opening in the rings 202 and 204 may be a physical opening, an open, crossed, or other non-closed switch, a deactivated transmission device or other obstruction operable to completely or effectively terminate, and thus remove channels from the rings 202 and 204 at the terminal points such that interference of each channel with itself due to recirculation is prevented or minimized such that the channels may be received and decoded within normal operating limits.

In one embodiment, the rings 202 and 204 are open, and thus terminate, in the nodes 201. In a particular embodiment, the rings 202 and 204 may terminate in neighboring nodes 201 at corresponding points along the rings 202 and 204. Terminal points in the rings 202 and 204 may be corresponding when, for example, they are between add and/or drop devices of two neighboring nodes or when similarly positioned within a same node. Further details regarding the open ring configuration are described below in reference to FIG. 13.

Figure 9:
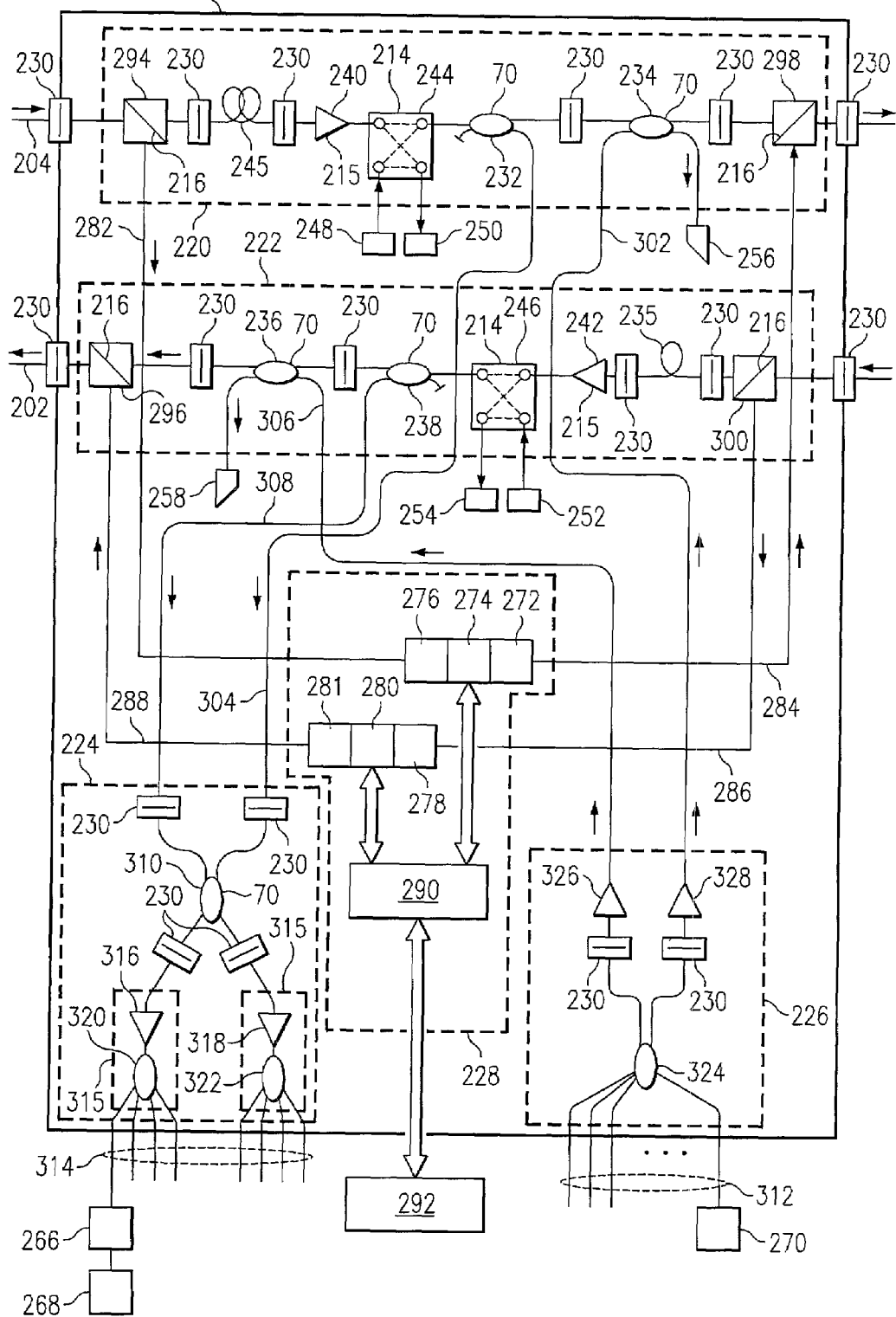
FIG. 9 is a block diagram illustrating details of the node of the optical network of FIG. 8 in accordance with one embodiment of the present invention.

FIG. 9 illustrates details of the node 201 in accordance with one embodiment of the present invention. In this embodiment, optical supervisory channel (OSC) traffic is transmitted in an external band separate from the revenue-generating traffic. In a particular embodiment, the OSC signal is transmitted at a wavelength of 1510 nanometers (nm).

Referring to FIG. 9, the node 201 comprises counterclockwise transport element 220, clockwise transport element 222, distributing element 224, combining element 226, and managing element 228. In one embodiment, the elements 220, 222, 224, 226 and 228 as well as components within the elements may be interconnected with optical fiber links. In other embodiments, the components may be implemented in part or otherwise with planar waveguide circuits and/or free space optics. In addition, as described in connection with nodes 12, the elements of node 201 may each be implemented as one or more discrete cards within a card shelf of the node 201. Exemplary connectors 230 for a card shelf embodiment are illustrated by FIG. 9. The connectors 230 may allow efficient and cost effective replacement of failed components. It will be understood that additional, different and/or other connectors may be provided as part of the node 201.

Transport elements 220 and 222 may each comprise passive couplers or other suitable optical splitters 70, ring switch 214, amplifier 215, and OSC filters 216. Optical splitters 70 may comprise splitters 70 or other suitable passive device. Ring switch 214 may be a 2×2 or other switch operable to selectively open the connected ring 202 or 204. In the 2×2 embodiment, the switch 214 includes a "cross" or open position and a "through" or closed position. The cross position may allow for loopback, localized and other signal testing. The open position allows the ring openings in the nodes 201 to be selectively reconfigured to provide protection switching.

Amplifier 215 may comprise an EDFA or other suitable amplifier. In one embodiment, the amplifier is a preamplifier and may be selectively deactivated to open a connected ring 202 or 204 to provide protection switching in the event of failure of the adjacent switch 214. Because the span loss of clockwise ring 202 usually differs from the span loss of counterclockwise ring 204, the amplifier 215 may use an ALC function with wide input dynamic-range. Hence, the amplifier 215 may deploy AGC to realize gain-flatness against input power variation as well as ALC by internal VOA. The preamplifier 215 and the switch 214 are disposed in the transport elements 220 and 222 inside of the OSC filters 216 and between the ingress OSC filter 216 and the add/drop couplers 70. Thus, the OSC signal may be recovered regardless of the position of switch 214 or operation of preamplifier 215. OSC filters 216 may comprise thin film type, fiber grating or other suitable type filters.

In the specific embodiment of FIG. 9, counterclockwise transport element 220 includes a passive optical splitter set having a counterclockwise drop coupler 232 and a counterclockwise add coupler 234. The counterclockwise transport element 220 further includes OSC filters 294 and 298 at the ingress and egress edges, counterclockwise amplifier 240 between the ingress OSC filter 294 and drop coupler 232 and counterclockwise ring switch 244 between amplifier 240 and drop coupler 232. Thus, the switch 244 in this embodiment is on the ingress side of the transport element and/or drop coupler. The counterclockwise transport element 220 may also include a dispersion compensation fiber (DCF) segment 245 to provide dispersion compensation. In one embodiment, DCF segment 245 may be included where the network 200 operates at rates at or above 2.5 G, if the circumference of the ring is over 40 kilometers, or depending on the length of the span to the previous node. For example, dispersion compensation may be used when 10 Gb/s signal travels over 40 kilometers of 1.3 micrometer zero-dispersion single mode fiber.

Clockwise transport element 222 includes a passive optical splitter set including clockwise add coupler 236 and clockwise drop coupler 238. Clockwise transport element 222 further includes OSC filters 296 and 300, clockwise amplifier 242, and clockwise ring switch 246. OSC filters 296 and 300 are disposed at the ingress and egress edges of the clockwise transport element 222. The clockwise amplifier 242 is disposed between the ingress OSC filter 300 and the drop coupler 238 while the clockwise ring switch 246 is disposed between the amplifier 242 and the drop coupler 238. Thus, the switch 246 in this embodiment is on the ingress side of the transport element and/or drop coupler. The clockwise transport element 222 may also include a DCF segment 235 to provide dispersion compensation depending, as previously discussed, on the data transport rate and/or the length of the span to the previous node or the circumference of the ring.

Distributing element 224 may comprise a plurality of distributing amplifiers 315. In this embodiment, the distributing element 224 may comprise a drop coupler 310 feeding into the distributing amplifiers 315 which each include an amplifier and an optical splitter. For example, a first distributing amplifier 315 may include amplifier 316 and optical splitter 320 while a second distributing amplifier 315 may include amplifier 316 and splitter 322. The amplifiers 316 and 318 may comprise EDFAs or other suitable amplifiers. Splitters 320 and 322 may comprise splitters with one optical fiber ingress lead and a plurality of optical fiber drop leads 314. The drop leads 314 may be connected to one or more tunable filters 266 which in turn may be connected to one or more broadband optical receivers 268.

Combining element 226 may be a combining amplifier and may comprise a splitter 324 with a plurality of optical fiber add leads 312 which may be connected to one or more add optical senders 270 associated with a client. Splitter 324 further comprises two optical fiber egress leads which feed into amplifiers 326 and 328. Amplifiers 326 and 328 may comprise EDFAs or other suitable amplifiers.

Managing element 228 may comprise OSC senders 272 and 281, OSC interfaces 274 and 280, OSC receivers 276 and 278, and an element management system (EMS) 290. Each OSC sender, OSC interface and OSC receiver set forms an OSC unit for one of the rings 202 or 204 in the node 201. The OSC units receive and transmit OSC signals for the EMS 290. The EMS 290 may be communicably connected to a network management system (NMS) 292. NMS may reside within node 201, in a different node, or external to all of the nodes 201.

EMS 290, NMS 292 and/or other elements or parts of node 201 or network 200 may comprise logic encoded in media for performing network and/or node monitoring, failure detection, protection switching and loopback or localized testing functionality of the network 200. Logic may comprise software encoded in a disk or other computer-readable medium and/or instructions encoded in an application specific integrated circuit (ASIC), field programmable gate array (FPGA), or other processor or hardware. It will be understood that functionality of EMS 290 and/or NMS 292 may be performed by other components of the network 200 and/or be otherwise distributed or centralized. For example, operation of NMS 292 may be distributed to the EMS of nodes 201 and the NMS omitted. Similarly, the OSC units may communicate directly with NMS 292 and EMS 290 omitted.

The node 201 further comprises counterclockwise add fiber segment 302, counterclockwise drop fiber segment 304, clockwise add fiber segment 306, clockwise drop fiber segment 308, OSC fiber segments 282, 284, 286, and 288, and optical spectrum analyzer (OSA) connectors 250, 254, 256, and 258. The OSA connectors may be angled connectors to avoid reflection. Test signal may sometimes be fed into the network from connectors 248 and 252. As previously described, a plurality of passive physical contact connectors 230 may be included where appropriate so as to communicably connect the various elements of node 201.

In operation, the transport elements 220 and 222 are operable to passively add local traffic to the rings 202 and 204 and to passively drop at least local traffic from the rings 202 and 204. The transport elements 220 and 222 may further be operable to passively add and drop the OSC signal to and from the rings 202 and 204. More specifically, in the counterclockwise direction, OSC filter 294 processes an ingress optical signal from counterclockwise ring 204. OSC filter 294 filters OSC signal from the optical signal and forwards the OSC signal to the OSC interface 274 via fiber segment 282 and OSC receiver 276. OSC filter 294 also forwards or lets pass the remaining transport optical signal to amplifier 240. By placing the OSC filter 294 outside of the ring switch 244, the node 201 is able to recover the OSC signal regardless of the position of the ring switch 244.

Amplifier 240 amplifies the signal and forwards the signal to ring switch 244. Ring switch 244 is selectively operable to transmit the optical signal to coupler 232 when the ring switch 244 is set to the through (closed) setting, or to transmit the optical signal to OSA connector 250 when the ring switch 244 is set to the cross (open) setting. Further details regarding the OSA connectors are described below.

If ring switch 244 is set in the cross position, the optical signal is not transmitted to couplers 232 and 234, the ring 204 is open at the node 201, and dropping of traffic from the ring 204 does not occur at node 201. However, adding of traffic at node 201 occurs and the added traffic flows to the next node in the ring 204. If the ring switch 244 is set in the through position, the optical signal is forwarded to couplers 232 and 234 and adding and dropping of traffic to and from the ring 204 may occur at node 201.

Coupler 232 passively splits the signal from switch 244 into two generally identical signals. A passthrough signal is forwarded to coupler 234 while a drop signal is forwarded to distributing element 224 via segment 304. The signals may be substantially identical in content and/or energy. Coupler 234 passively combines the passthrough signal from coupler 232 and an add signal comprising local add traffic from combining element 226 via fiber segment 302. The combined signal is passed to OSC filter 298.

OSC filter 298 adds an OSC signal from the OSC interface 274, via the OSC sender 272 and fiber segment 284, to the combined optical signal and forward the combined signal as an egress transport signal to ring 204. The added OSC signal may be locally generated data or may be received OSC data passed through the EMS 290.

In the clockwise direction, OSC filter 300 receives an ingress optical signal from clockwise ring 202. OSC filter 300 filters the OSC signal from the optical signal and forwards the OSC signal to the OSC interface 280 via fiber segment 286 and OSC receiver 278. OSC filter 300 also forwards the remaining transport optical signal to amplifier 242.

Amplifier 242 amplifies the signal and forwards the signal to ring switch 246. Ring switch 246 is selectively operable to transmit the optical signal to coupler 238 when the ring switch 246 is set to the through setting, or to transmit the optical signal to OSA connector 254 when the ring switch 246 is set to the cross setting.

If the ring switch 246 is set in the cross position, the optical signal is not transmitted to couplers 238 and 236, the ring 204 is open at the node 201, and dropping of traffic from the ring 202 does not occur at node 201. However, adding of traffic to the ring 202 occurs at node 201. If the ring switch 246 is set in the through position, the optical signal is forwarded to couplers 238 and 236 and adding and dropping of traffic to and from the ring 202 may occur at node 201.

Coupler 238 passively splits the signal from switch 246 into generally identical signals. A passthrough signal is forwarded to coupler 236 while a drop signal is forwarded to distributing unit 224 via segment 308. The signals may be substantially identical in content and/or energy. Coupler 236 passively combines the passthrough signal from coupler 238 and an add signal comprising local add traffic from combining element 226 via fiber segment 306. The combined signal is passed to OSC filter 296.

OSC filter 296 adds an OSC signal from the OSC interface 280, via the OSC sender 281 and fiber segment 288, to the combined optical signal and forwards the combined signal as an egress transport signal to ring 202. As previously described, the OSC signal may be locally generated data or data passed through by EMS 290.

Prior to addition to the rings 202 and 204, locally-derived traffic is transmitted by a plurality of add optical senders 270 to combining element 226 of the node 201 where the signals are combined, amplified, and forwarded to the transport elements 220 and 222, as described above, via counterclockwise add segment 302 and clockwise add segment 306. The locally derived signals may be combined by the optical coupler 324, by a multiplexer or other suitable device.

Locally-destined traffic is dropped to distributing element 224 from counterclockwise drop segment 304 and clockwise drop segment 308. Distributing element 224 splits the drop signal comprising the locally-destined traffic into multiple generally identical signals and forwards each signal to an optical receiver 268 via a drop lead 314. The signal received by optical receivers 268 may first be filtered by filters 266. Filters 266 may be tunable filters or other suitable filters and receivers 268 may be broadband or other suitable receivers.

EMS 290 monitors and/or controls all elements in the node 201. In particular, EMS 290 receives an OSC signal in an electrical format via OSC filters 294, 296, 298 and 300, OSC receivers 276 and 278, OSC senders 272 and 281, and OSC interfaces 274 and 280. EMS 290 may process the signal, forward the signal and/or loopback the signal. Thus, for example, the EMS 290 is operable to receive the electrical signal and resend the OSC signal to the next node, adding, if appropriate, node-specific error information or other suitable information to the OSC.

In one embodiment each element in a node 201 monitors itself and generates an alarm signal to the EMS 290 when a failure or other problem occurs. For example, EMS 290 in node 201 may receive one or more of various kinds of alarms from the elements and components in the node 201: an amplifier loss-of-light (LOL) alarm, an amplifier equipment alarm, an optical receiver equipment alarm, optical sender equipment alarm, a distributing amplifier LOL alarm, a distributing amplifier equipment alarm, a combining amplifier LOL alarm, a combining amplifier equipment alarm, or other alarms. Some failures may produce multiple alarms. For example, a fiber cut may produce amplifier LOL alarms at adjacent nodes and also error alarms from the optical receivers.

In addition, the EMS 290 may monitor the wavelength and/or power of the optical signal within the node 210 via connections (not shown) between the OSA connectors 250, 254, 256, and 258 and an optical spectrum analyzer (OSA) communicably connected to EMS 290.

The NMS 292 collects error information from all of the nodes 201 and is operable to analyze the alarms and determine the type and/or location of a failure. Based on the failure type and/or location, the NMS 292 determines needed protection switching actions for the network 200. The protection switch actions may be carried out by NMS 292 by issuing instructions to the EMS 290 in the nodes 201. After a failure is fixed, the network 200 does not require reverting. Thus, the open ring network configuration does not change for protection switching, only the location of the openings. In this way, network operation is simplified and node programming and operation is cost minimized or reduced.

Error messages may indicate equipment failures that may be rectified by replacing the failed equipment. For example, a failure of one of the amplifiers in the distributing element may trigger a distributing amplifier alarm. The failed amplifier can then be replaced. A failed coupler in the distributing element may be likewise detected and replaced. Similarly, a failure of an optical receiver or sender may trigger an optical receiver equipment alarm or an optical sender equipment alarm, respectively, and the optical receiver or sender replaced as necessary. The optical sender should have a shutter or cold start mechanism. Upon replacement, no other switching or reversion from a switched state may be required. As described further below in reference to FIGS. 16 and 18, the NMS 292 may in response to certain messages or combinations of messages trigger a protection switching protocol.

Figure 10A:
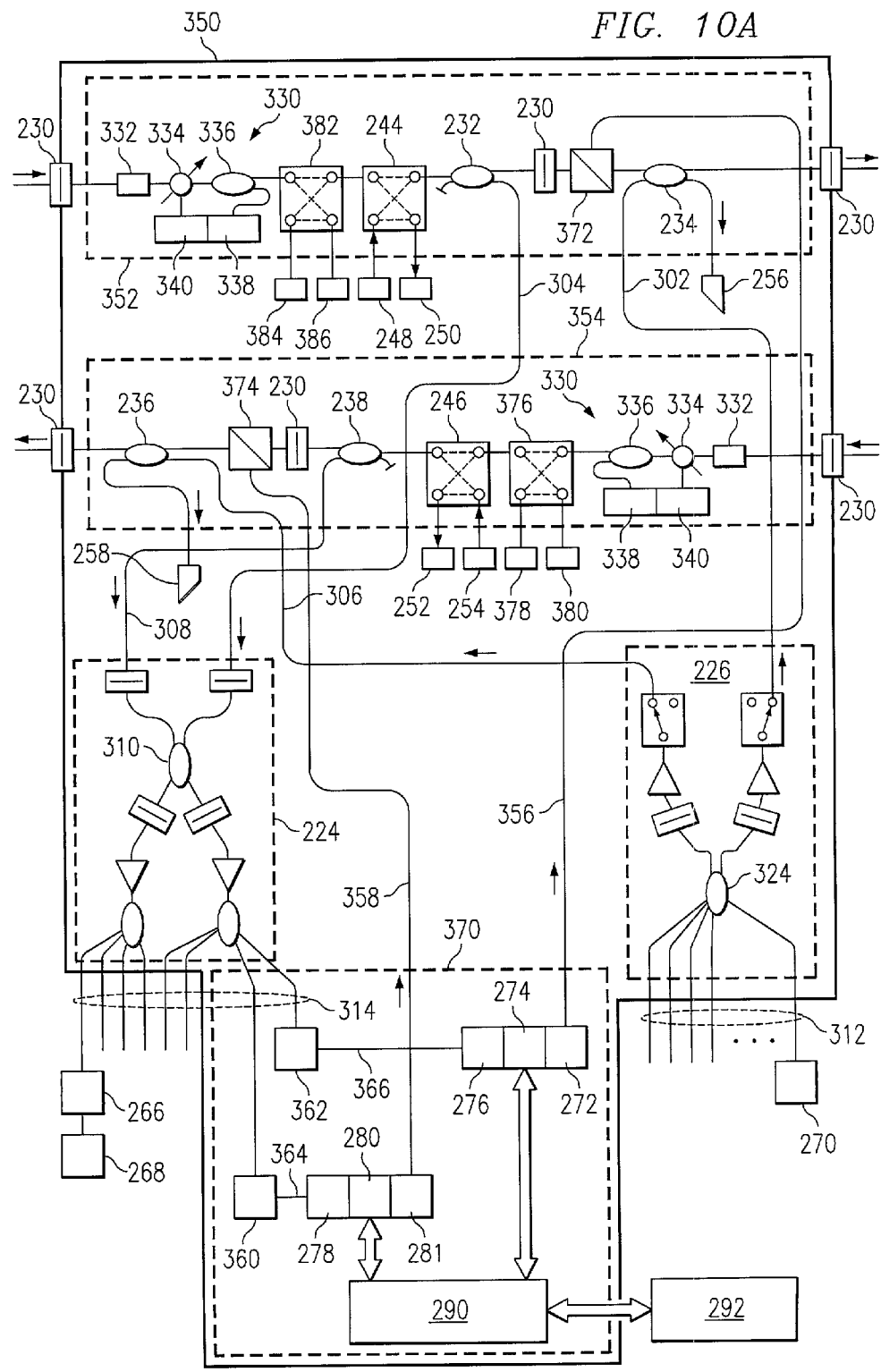
FIGS. 10A–C are block diagrams illustrating elements of the node of the optical network of FIG. 8 in accordance with other embodiments of the present invention.
Figure 10B:
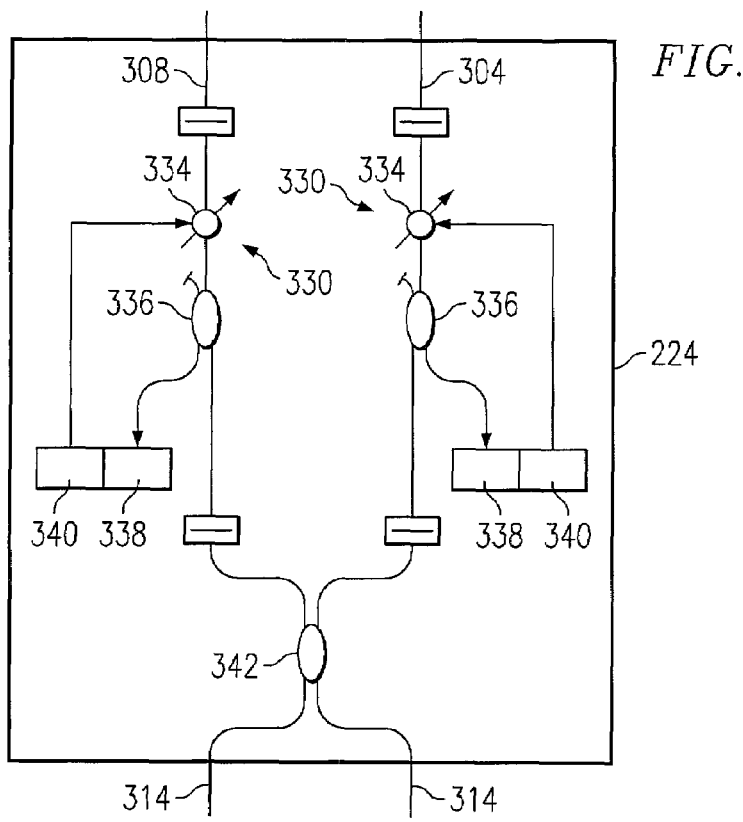
Figure 10C:
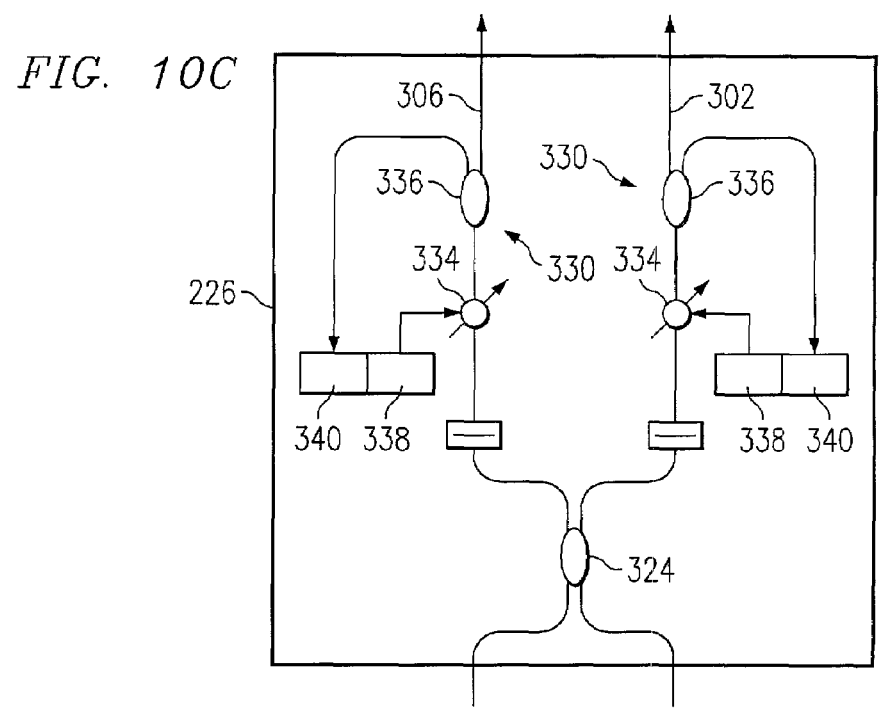

FIGS. 10A–C illustrate details of the node 201 and elements of the node 201 in accordance with other embodiments of the present invention. In the embodiment of FIG. 10A, OSC signals are transmitted in-band with revenue-generating traffic. In addition, redundant ring switches and variable optical attenuators (VOAs) are provided in the transport elements. In the embodiment of FIG. 10B, the distributing element 224 utilizes VOAs in the place of amplifiers. In the embodiment of FIG. 10C, the combining element 226 uses VOAs in place of amplifiers in order that signal levels to the clockwise ring via clockwise add fiber segment 306 and to the counterclockwise ring via counterclockwise add fiber segment 302 are able to be controlled independently of each other in order to adjust "through" signal levels. For example, the "through" signal level of the clockwise and clockwise rings may differ from each other if the transport elements do not have pre-amplifiers.

Referring to FIG. 10A, the node 350 comprises a distributing element 224 and a combining element 226 as described above in reference to FIG. 9. In this embodiment, the combining element 226 may include two position safety switches 251 which may be opened to stop transmission of a signal onto a line with a fiber cut in order to allow the cut to be repaired safely. It will be understood that the node 350 may include other switches or suitable devices to stop transmission of a signal onto a fiber that is under repair. For example, the node 350 may include a device in the transport elements to prevent ingress traffic on the ring from being transmitted out onto a span under repair.

The node 350 further comprises the counterclockwise add fiber segment 302, counterclockwise drop fiber segment 304, clockwise add fiber segment 306, clockwise drop fiber segment 308, plurality of add leads 312, plurality of drop leads 314, OSA connectors 250, 252, 256, and 258, inputs 248 and 254 and a plurality of passive connectors 230 as described above in connection with FIG. 9.

Node 350 comprises a counterclockwise transport element 352 which comprises a passive optical splitter set including counterclockwise drop coupler 232 and counterclockwise add coupler 234, and further comprises counterclockwise ring switch 244. These elements are described above in reference to FIG. 9. Counterclockwise transport segment 352 further comprises redundant ring switch 382, OSC filter 372, and VOA unit 330. OSC filter 372 may comprise a thin film type or a fiber grating type filter. Out-of-band OSC filters 216 and amplifier 214 are omitted in this embodiment.

Node 352 further comprises a clockwise transport element 354 which comprises a passive optical splitter set including clockwise add coupler 236 and clockwise drop coupler 238, and further comprises clockwise ring switch 246. These elements are as described above in reference to FIG. 9. Clockwise transport segment 354 further comprises redundant ring switch 376, OSC filter 374 and VOA unit 330. OSC filter 374 may comprise a thin film type or a fiber grating type filter. The out-of-band OSC filters 216 and amplifier 214 are omitted in this embodiment.

The VOA unit 330 is on an egress side of an isolator 332. The VOA unit 330 includes a VOA 334, an optical splitter 336, a photodetector 338 and a controller 340. The isolator 332 prevents upstream feedback. The VOA 334 attenuates the ingress signal to a specified power level based on a feedback loop including splitter 336 which taps the signal, photodetector 338 which detects the power level of the signal and feedback controller 340 which controls VOA 334 based on the detected power level.

Node 352 further comprises a managing element 370 which comprises OSC senders 272 and 281, OSC interfaces 274 and 280, OSC receivers 276 and 278, and an EMS unit 290. These elements are as described above in reference to FIG. 9. Managing element 370 further comprises filters 360 and 362, optical fiber segments 364 and 366, and OSC-add optical fiber segments 356 and 358.

In operation, OSC signals are transmitted in-band. OSC receivers 276 and 278 are operable to receive ingress OSC signals via two of drop leads 314. Filters 360 and 362 are operable to selectively filter the OSC data from the optical signals transmitted by distributing element 224. In one embodiment, two wavelengths are dedicated to OSC signals: for example, 1530.33 nm for clockwise-ring OSC signals, and 1531.12 nm for counterclockwise-ring OSC signals. Filters 360 and 362 are tuned accordingly. OSC filter 372 rejects the incoming OSC signal; 1531.12 nm and adds the OSC signal; 1531.12 nm via segment 356. OSC filter 374 rejects the incoming OSC signal; 1530.33 nm and adds the OSC signal; 1530.33 nm via segment 358. Processed OSC data may be added to the rings 202 and 204 from clockwise OSC sender 281 and counterclockwise OSC sender 272 via counterclockwise OSC filter 372, counterclockwise OSC filter 374 and OSC-add fiber segments 356 and 358, respectively.

The redundant ring switches 382 and 376 allow for continued circuit protection in the event of switch failure and failed ring switches may be replaced without interfering with node 350 operations or configuration. Redundant ring switches 382 and 376 may further comprise OSA connectors 378 and 386 to allow for monitoring of the wavelength and/or power of the optical signal and inputs 380 and 384.

When the ring switch has the cross position, cascaded switch configuration allows switch operation test. Either switch 382 or 244 is allowed to take through or cross position for testing, because the other is in cross position. When the ring switch is required to change from the through position to the cross position, the cascaded switch configuration gives redundancy to open the segment of the ring. Alternatively, redundancy in the event of a switch stuck in the closed position can be accomplished without a redundant switch by turning off the amplifier for that ring 202 or 204 in the node 201 with the failed switch, thus effectively terminating the signal at the amplifier.

FIG. 10B illustrates the distributing unit 224 in accordance with another embodiment of the present invention. In this embodiment, the drop signals are attenuated or otherwise suitably controlled in the distributing element 224 and VOA units, amplifiers or other suitable conditioners are not necessary in the transport elements 352 and 354.

Referring to FIG. 10B, distributing unit 224 includes two VOA units 330 and a coupler 342 with a suitable number of egress drop leads 314. As previously described, the VOA units 330 each attenuate an ingress signal to a specified power level through a feedback loop including splitter 336, photodetector 338 and feedback controller 340.

FIG. 10C illustrates the combining element 226 in accordance with another embodiment of the present invention. In this embodiment, the combining element 226 includes two VOA units 330 for each add line 302 and 306 to attenuate or otherwise suitably condition the add signals. The combining element 226 with VOA units 330 may be used in connection with distributing element 224 with VOA units 330 and, as previously described, the in-ring amplifiers, VOA units, or signal conditioners may be omitted.

Referring to FIG. 10C, ingress signals are combined at a many to two optical splitter 324 and passed to the VOA units 330. As previously described, the VOA units 330 each attenuate the add signal with VOA 334. VOA 334 is controlled by a feedback loop including optical splitter 336, photodetector 338 and feedback controller 340. In this way, add signal intensity may be suitably controlled for adding and transport in the rings 202 and 204.

Figure 11:
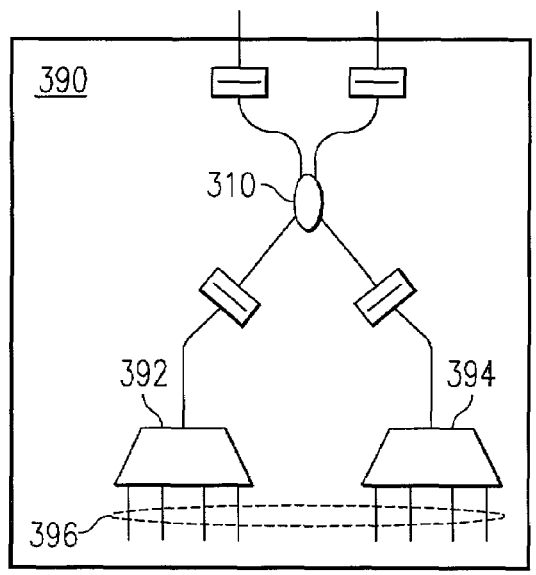
FIG. 11 is a block diagram illustrating the distributing element of FIG. 9 in accordance with another embodiment of the present invention.

FIG. 11 illustrates the distributing element of node 201 in accordance with another embodiment of the present invention. The embodiment shown in FIG. 11 may be used as an alternative to the distributing element 224 of FIGS. 9 and 10.

Referring to FIG. 11, distributing element 390 comprises array wave guide gratings (AWGs) 392 and 394 operable to demultiplex the optical signal from coupler 310. Demultiplexing includes a filtering function, so that filters 266 are not required in this embodiment. The demultiplexed signals are forwarded to receivers 268 via leads 396. Thus, each receiver receives a discrete traffic channel rather than a signal comprising all of the traffic channels as with distributing element 224.

Figure 12:
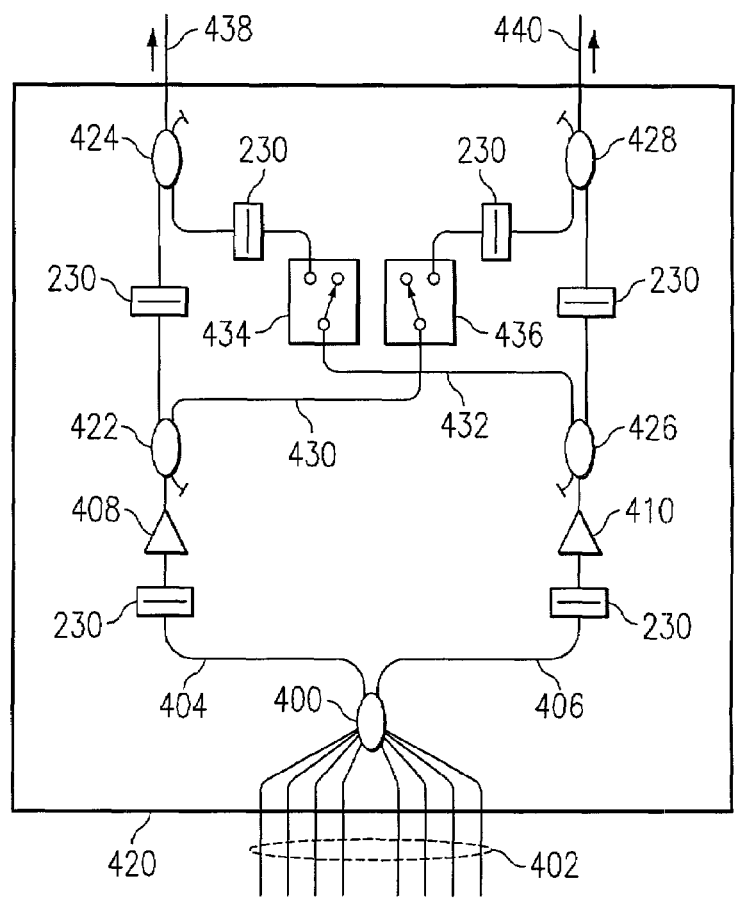
FIG. 12 is a block diagram illustrating the combining element of FIG. 9 in accordance with another embodiment of the present invention.

FIG. 12 illustrates the combining element of a node 201 in accordance with another embodiment of the present invention. The embodiment shown in FIG. 12 may be used as an alternative to the combining element 226 of FIGS. 9 and 10.

Referring to FIG. 12, combining element 420 comprises coupler 400 operable to receive signals from client via leads 402 and to combine those signals into optical fibers 404 and 406. Amplifiers 408 and 410 amplify the optical signals carried by fibers 404 and 406 respectively. Connectors 230 connect coupler 400 to optical fibers 404 and 406. Amplifiers 408 and 410 may comprise EDFAs or other suitable amplifiers. Combining element 420 further comprises couplers 422, 424, 426, and 428, leads 430 and 432, switches 434 and 436, and optical fibers 438 and 440.

In operation the combined signals from coupler 400 are amplified via amplifiers 408 and 410 and split at couplers 422 and 426. One copy of the split signal is sent to couplers 424 and 428. Another copy of the split signal from couplers 422 and 426 is sent to switches 434 and 436 respectively, via leads 432 and 430. Switches 434 and 436 are operable to selectively transmit an optical signal to couplers 424 and 428.

During normal operation, the switches 434 and 436 are open such that only one copy of local add traffic is provided to each transport element 220 and 222 of node 201. In case of failure of amplifier 408, switch 434 is switched to the on, or closed position, thus allowing for add traffic to be transmitted to both transport elements 220 and 222 through leads 438 and 440. Likewise in case of failure of amplifier 410, switch 436 is switched to the on, or closed position allowing for transmission of the add traffic to both transport elements 220 and 222 through fibers 438 and 440. In addition, the switching mechanism of the embodiment shown in FIG. 12 allows for replacement of the failed amplifier while still allowing for transmission of the add traffic in the network 200.

Figure 13:
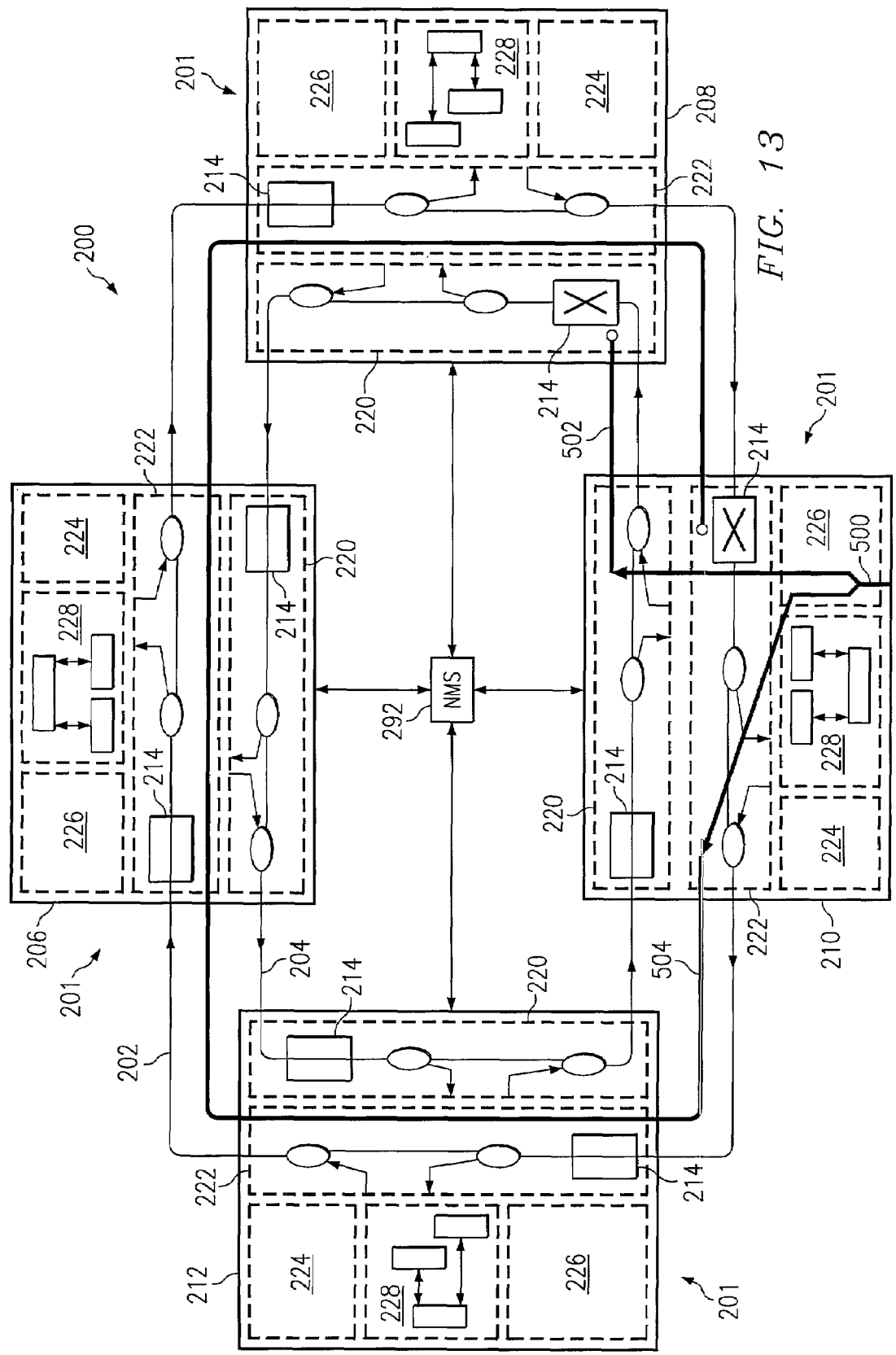
FIG. 13 is a block diagram illustrating the open ring configuration and light path flow of the optical network of FIG. 8 in accordance with one embodiment of the present invention.

FIG. 13 illustrates the optical network 200 with high level details of the nodes 206, 208, 210 and 212. As previously described, each node includes a counterclockwise transport element 220, a clockwise transport element 222, a distributing element 224, a combining element 226, and a managing element 228. The transport elements add and/or drop traffic to and from the rings 202 and 204. The combining element 226 combines ingress local traffic to generate an add signal that is provided to the transport elements 220 and 222 for transmission on the rings 202 and 204. The distributing element 224 receives a dropped signal and recovers local egress traffic for transmission to local clients. The managing element 228 monitors operation of the node 201 and/or network 200 and communicates with an NMS 292 for the network 200.

Referring to FIG. 13, each node 206, 208, 210 and 212 includes a ring switch 214 in each transport element 220 and 222 that is controllable to selectively open or close the connected ring 202 or 204 prior to the dropping or adding of traffic by the transport element 220 or 222 in the node. The ring switches 214 may be otherwise suitably positioned within one or more or each node 201 prior to the dropping and/or adding of traffic, at an inside or outside edge of the node 201 or between the node and a neighboring node 201.

During normal operation, a single ring switch 214 is crossed or otherwise open in each ring 202 and 204 while the remaining ring switches 214 are closed. Thus, each ring 202 and 204 is continuous or otherwise closed except at the ring switch 214 that is open. The ring switches 214 that are open in the rings 202 and 204 together form a switch set that effectively opens the rings 202 and 204 of the network 200 in a same span and/or corresponding point of the network 200. A same span is opened in the network 200 in that, for example, the nodes 201 neighboring the span do not receive and/or receive for dropping ingress traffic from the span. Such alignment of the open ring switches 214 in, along or at the periphery of a span allows each node 201 may communicate with each other node 201 in the network 200 while avoiding or minimizing interference from circulating traffic.

In the illustrated embodiment, ring switch 214 in the clockwise transport element 222 of node 210 is crossed as is ring switch 214 in the counterclockwise transport element 220 of node 208. The remaining ring switches 214 are closed to a through position. A traffic channel 500 added at node 210 travels around the rings 202 and 204 in exemplary light paths 502 and 504. In particular, a counterclockwise light path 502 extends from the combining element 226 of node 210 to the counterclockwise transport element 220 where it is added to counterclockwise ring 204. On counterclockwise ring 204, light path 502 extends to node 208 where it is terminated by the crossed ring switch 214 of the counterclockwise transport element 220. Clockwise light path 504 extends from the combining element 226 of node 210 to the clockwise transport element 222 of node 210 where it is added to clockwise ring 202. On clockwise ring 202, light path 504 extends to ring 212, through the clockwise transport element 222 of ring 212, to ring 206, through the clockwise transport element 222 of ring 206, to node 208, through the clockwise transport element 222 of node 208, and back to node 210 where it is terminated by the crossed ring switch 214 on the ingress side of the clockwise transport element 222. Thus, each node 206, 208, 210 and 212 is reached by each other node from a single direction and traffic is prevented from circulating around either ring 202 and 204 or otherwise causing interference.

Figure 14:
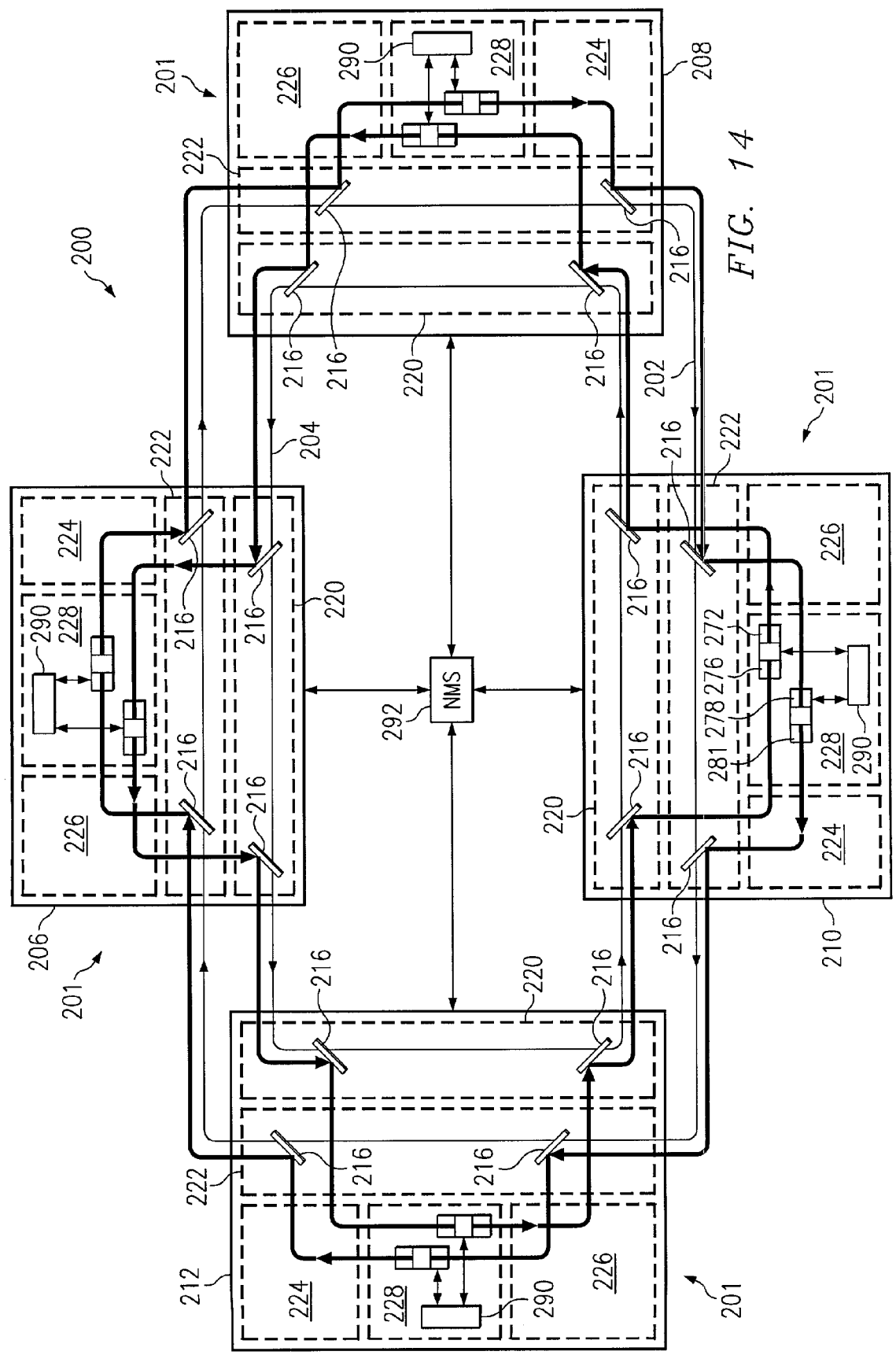
FIG. 14 is a block diagram illustrating the optical supervisory channel (OSC) flow in the optical network of FIG. 8 in accordance with one embodiment of the present invention.

FIG. 14 illustrates the optical network 200 with high level details of the nodes 206, 208, 210 and 212. The nodes each include the counterclockwise and clockwise transport elements 220 and 222 as well as the combining element 224, distributing element 226 and managing element 228. In addition to adding and dropping traffic channels to and from the rings 202 and 204, the transport elements 220 and 222 add and drop the OSC to and from the rings 202 and 204 for processing by managing element 228.

Referring to FIG. 14, as previously described, the transport elements 220 and 222 include an OSC filter 216 at an ingress point prior to the ring switches 214 to filter out and/or otherwise remove the OSC from the rings 202 and 204. In each node 201, the OSC signal from each ring 202 and 204 is passed to corresponding optical receiver 276 and 278 of the OSC unit for processing by EMS 290. In addition, the OSC signal generated by the EMS 290 for each ring 202 and 204 is transmitted by the optical sender 272 or 281 onto the corresponding ring 202 and 204 for transmission to the next node 201.

In normal operation, each node 201 receives an OSC signal from the neighboring nodes along the rings 202 and 204, processes the signal and passes the OSC signal on and/or adds its own OSC signal for transmission to the neighboring nodes.

Placement of the OSC filters 216 at the periphery of the transport elements 220 and 220 outside the ring switches 214 allows each node 201 to receive the OSC signal from its neighboring, or adjacent nodes 201 regardless of the open/close status of its ring switches 214. If the OSC filters are inside the ring switches 214, for example, in embodiments where the ring switches 214 are outside of the nodes 201, the OSC signals may be looped back between rings 202 and 204 at the edges of the open span. For example, for the illustrated embodiment, the EMS 290 of node 208 may pass received OSC information destined for node 210 from the clockwise OSC unit to the counterclockwise OSC unit for transmission to node 210 on the counterclockwise ring 204. Similarly, OSC information received at node 210 and destined for node 208 may be passed by the EMS 290 of node 210 from the counterclockwise OSC unit to the clockwise OSC unit for transmission to node 208 on the clockwise ring 202.

Figure 15:
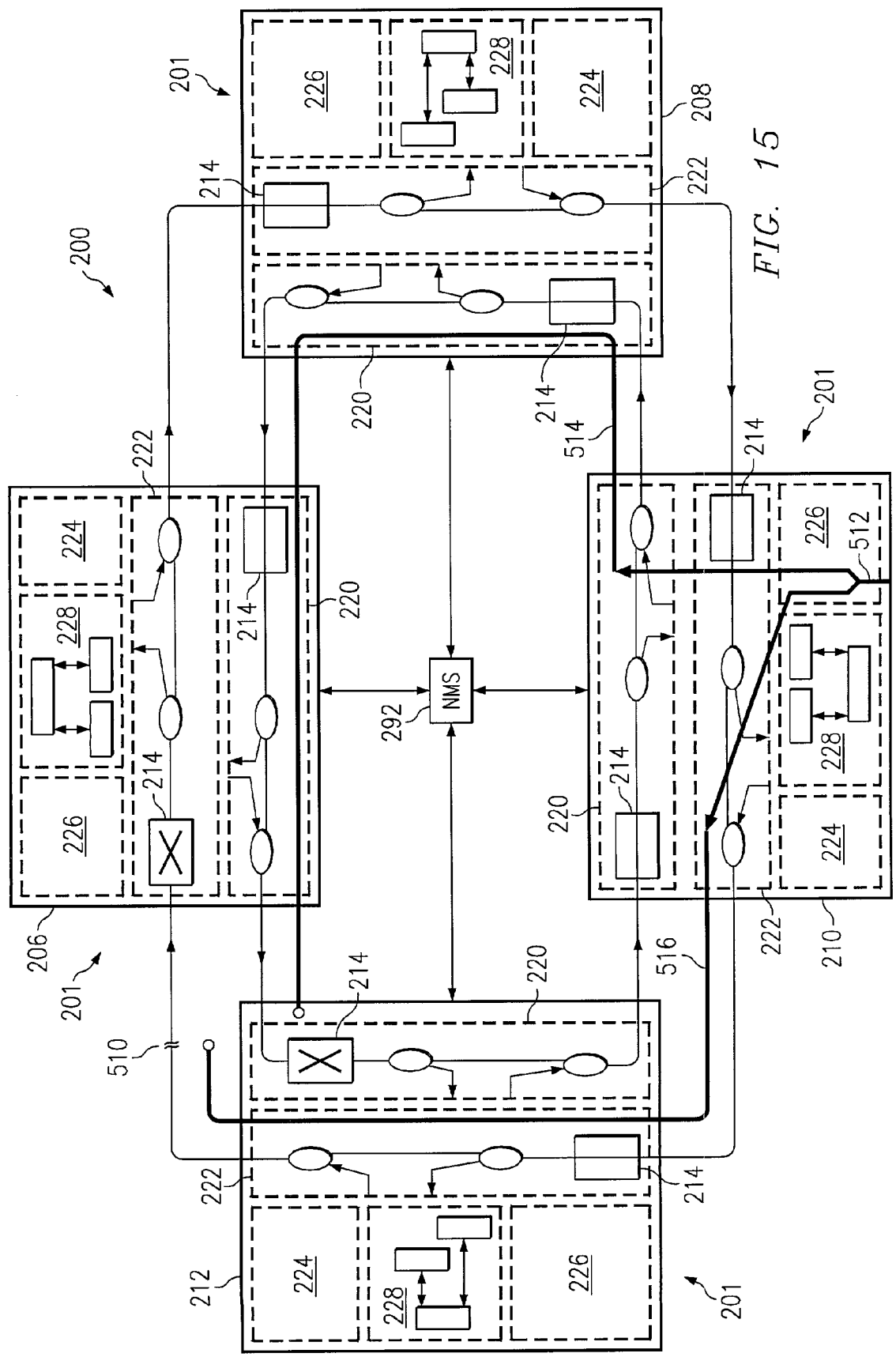
FIG. 15 is a block diagram illustrating protection switching and light path protection in the optical network of FIG. 8 in accordance with one embodiment of the present invention.

FIG. 15 illustrates protection switching and light path protection for network 200 in accordance with one embodiment of the present invention. As previously described, each node 206, 208, 210, and 212 includes clockwise and counterclockwise transport elements 220 and 222 as well as the combining, distributing and managing elements 224, 226, and 228. The managing elements each communicate with NMS 292.

Referring to FIG. 15, a fiber cut 510 is shown in ring 204 between nodes 206 and 212. In response, as described in more detail below, the NMS 292 opens the ring switch 214 in counterclockwise transport element 220 of node 212 and the ring switch 214 in clockwise transport element 222 of node 206, thus effectively opening the span between nodes 206 and 212. After opening the rings 202 and 204 on each side of the break, the NMS 292 closes any previously open ring switches 214 in the nodes 201.

After protection switching each node 201 in the network 200 continues to receive traffic from each other node 201 in the network 200, and an operable open ring configuration is maintained. For example, a signal 512 originated in node 210 is transmitted on counterclockwise light path 514 to nodes 208 and 206 and transmitted on clockwise light path 516 to node 212. In one embodiment, the NMS 292, EMS 290 and the 2×2 ring switches 214 may be configured for fast protection switching, with a switching time of less than 10 milliseconds. In the other example, the input monitor of ingress amplifier 242 on the clockwise ring 201 in the node 206 detects the loss of light due to the fiber cut 510, then the EMS 290 in the node 206 may open the ring switch 214 in the node 206 locally. The EMS 290 reports to NMS 292. The NMS opens the ring switch 214 in the node 212 and closes any previous open ring switches 214 in the nodes 201.

Figure 16:
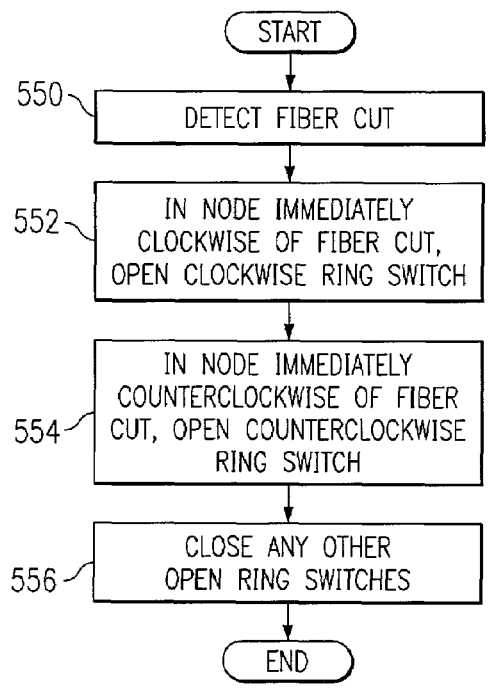
FIG. 16 is a flow diagram illustrating a method for protection switching for the optical network of FIG. 8 in accordance with one embodiment of the present invention.

FIG. 16 is a flow diagram illustrating a method for protection switching of an open ring optical network in accordance with one embodiment of the present invention. In this embodiment, the optical network may be network 200 including a plurality of nodes each having a ring switch at or proximate to an ingress point of each connected ring. The method may be used in connection with other suitable network and node configurations.

Referring to FIG. 16, the method begins at step 550 with the detection by the NMS 292 of a fiber cut of ring 202 or 204 of the network 200. The NMS 292 may detect and locate the fiber cut based on the OSC and/or other signals communicated by the node EMSs 290 to the NMS 292. For example, a fiber cut may be detected by the NMS 292 based on an LOL alarm from a down stream preamplifier 242 of a neighboring node 201.

At step 552, the NMS 292 issues a command to the EMS 290 in the node 201 immediately clockwise of the cut to open the clockwise ring switch 246 in the clockwise transport element 222, this opening the clockwise ring 202 at that node 201. The down stream preamplifier 242 may open the clockwise ring switch 246 on behalf of NMS 292 or EMS 290.

At step 554, the NMS 292 issues a command to the EMS 290 in the node 201 immediately counterclockwise of the cut to open the counterclockwise ring switch 244 in the counterclockwise transport element 220, this opening the counterclockwise ring 204 at that node 201.

At step 556, any other ring switches 214 in the nodes 201 of the network 200 are closed. Thus, each ring 202 and 204 is essentially continuous with a single open point and/or segment. The open segment may be at a discrete switch and/or transmission element or may include part, all or even more than a span between nodes of the network 200. It will be understood that additional switches 214 in the rings 200 and/or 204 may remain open and that amplifier, VOA and other suitable devices in the rings 202 and/or 204 may be turned off so long as, in one embodiment, each node 201 is able to communicate with each other node 201 through one of the rings 202 or 204.

An example of protection switching is illustrated by FIGS. 13 and 15. Referring back to FIG. 13, for example, the clockwise and counterclockwise rings 202 and 204 of network 200 are open in the transport elements 222 and 220 of nodes 210 and 208, respectively. In response to at least a ring cut 510 as illustrated by FIG. 15, protection switching crosses ring switch 214 and clockwise transport element 222 of node 206 and ring switch 214 of counterclockwise transport element 220 of node 212. Thus, in FIG. 15 the clockwise and counterclockwise rings 202 and 204 are opened at nodes 206 and 212, respectively. The previously crossed ring switches in nodes 208 and 210 are closed to a through position to allow each node 201 in the network 200 to continue to receive traffic from each other node 201 in the network 200. The fiber cut 510 may be repaired at a convenient time after protection switching is completed. Furthermore, it should be noted that, after repair of the fiber cut 510, there is no need to revert the switches 214 and nodes 201 to their pre-cut states. For example, the network initially configured as shown in FIG. 13 that is then configured as shown in FIG. 15 due to fiber cut 510 may remain configured as shown in FIG. 15 even after the cut 510 has been repaired. In this way, the steps shown in FIG. 16 may be repeated for any number of fiber cut events.

As previously described, the ring switches 214 and the nodes 201 may be reconfigured to provide protection switching in response to other types of network failures that would otherwise prevent one node 201 from communicating local and/or other traffic to a neighboring node 201. For example, in response to failure of the preamplifier 242 of the clockwise transport element 222 of node 206, the failed preamplifier 242 may be turned off and the adjacent ring switch 246 actuated from a closed, or through position to an open, or cross position. Failure of the preamplifier unit 242 may be detected from a preamplifier equipment alarm for that amplifier. As previously described, a crossed ring switch 214 terminates traffic on the connected ring 202 or 204 but may pass the traffic to the OSAs for monitoring by the EMS 290 and/or for loopback and other types of testing. Next, the ring switch 214 of the counterclockwise transport element 220 in node 212 may also be repositioned to the crossed position.

After the ring switches are crossed, the previously crossed ring switches 214 are closed to a through position to allow each node 201 to fully communicate with each other node 201. During continued operation, the failed preamplifier unit 242 may be replaced and proper operation of the new preamplifier unit 242 confirmed with loopback and/or localized testing as described in more detail below. After the failed preamplifier 242 is replaced and proper operation is confirmed, the network 200 may be left in the current configuration, reverted to the previous configuration or configured to yet another configuration to support localized and/or loopback testing within the network 200.

As another example, if the distributing amplifiers of node 206 report an LOL alarm and there is no alarm in the preamplifier 242 in the node 206 but a LOL, alarm from the preamplifier 242 in the nodes 208, the NMS 292 may determine there is a failure of the drop coupler 238 in the clockwise transport element 222. In response, the NMS 292 may implement protection switching as previously described for the preamplifier failure with the failed coupler being replaced and tested. A failure of the ring switch 214 in the clockwise transport element 222 of node 206 may be detected by an equipment alarm for that switch and protection switching implemented as previously described for the preamplifier unit failure. In addition, if the switch 214 fails in a closed position, the preamplifier 242 may be turned off to effectively open the ring at the point of the failed switch 214.

A failure of an amplifier in the combining element 226 may be detected by an equipment alarm for a combining amplifier. For example, in response to an equipment alarm for a combining amplifier in the combining element 226 of the clockwise transport element 222 of node 210, the ring switch 246 of clockwise transport element 222 in node 212 may be crossed and the ring switch 244 in the counterclockwise transport element 220 of node 210 may also be crossed. Previously opened ring switches 214 are then or at the same time closed and the failed combining amplifier unit in node 210 replaced and tested to confirm proper operation. In another embodiment, where the combining element 226 includes crossover protection switches as illustrated by FIG. 12, the switch 434 or 436 for the nonfailed amplifier may be closed to allow the working amplifier to transmit traffic both directions on the rings 202 and 204. In this embodiment, failure of a combining amplifier is protected without affecting the network configuration.

Figure 17:
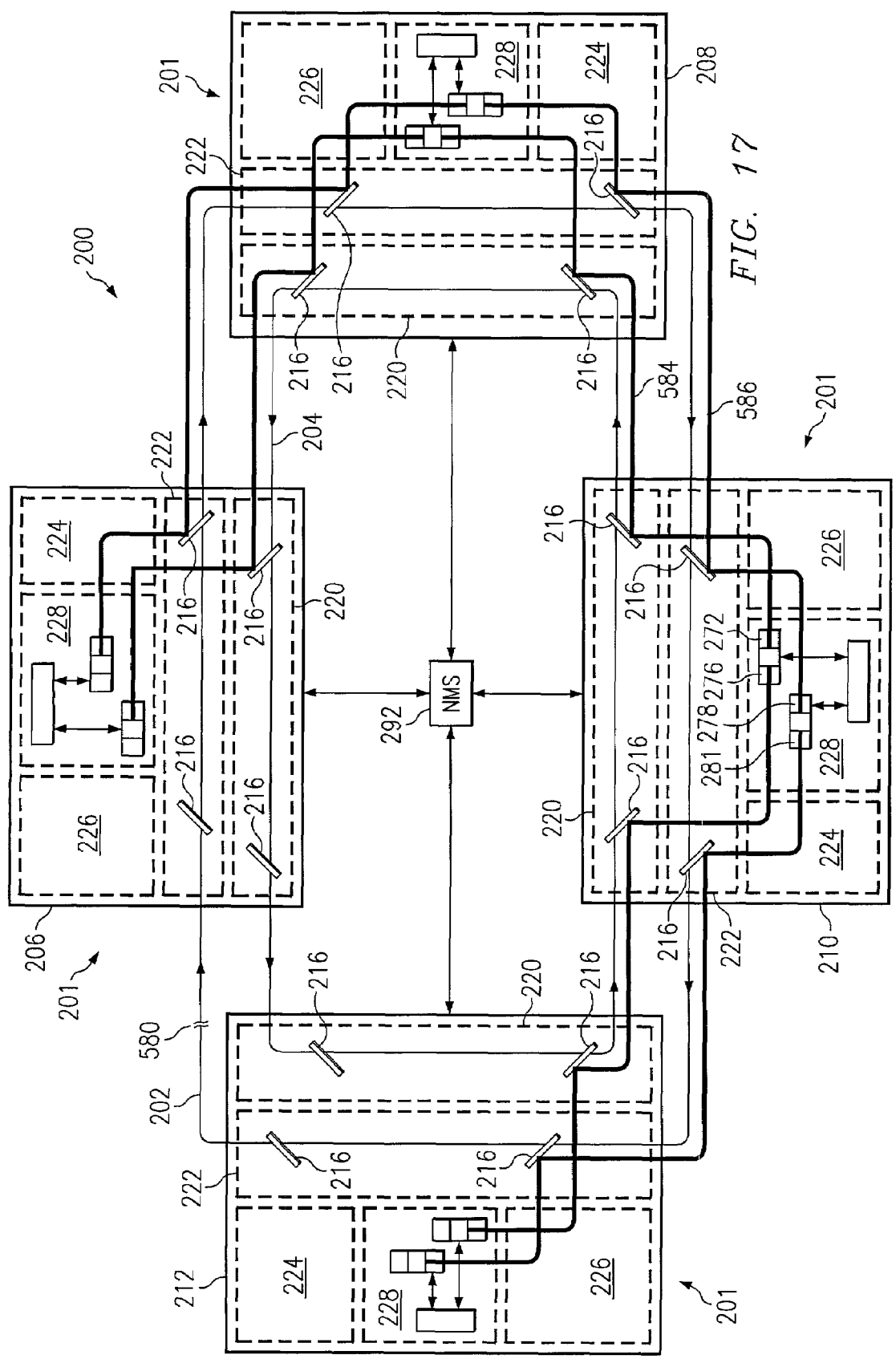
FIG. 17 is a block diagram illustrating OSC protection in the optical network of FIG. 8 in response to a line cut in accordance with one embodiment of the present invention.

FIG. 17 illustrates OSC protection for network 200 in response to a line cut in accordance with one embodiment of the present invention. In this embodiment, optical-electrical loopback in the managing elements 228 of the nodes 201 is used for protection of OSC.

Referring to FIG. 17, a fiber cut or other line break 580 is shown in clockwise ring 202 between nodes 206 and 212. In response to the fiber cut 580, an optical-electrical loopback 582 is established from the counterclockwise OSC system to the clockwise OSC system through EMS 290 in node 206 and from the clockwise OSC system to the counterclockwise OSC system through EMS 290 in node 212.

In a specific embodiment, the optical-electrical loopback in node 206 comprises receiving at the counterclockwise OSC unit of the managing element 228 of node 206 the OSC 584 from the counterclockwise ring 204 and processing the OSC at the EMS 290 as described above in reference to FIG. 9. However, instead of transmitting the processed OSC as an egress signal on the counterclockwise ring 204 from node 206, the processed OSC is transmitted from the EMS 290 to the clockwise OSC unit and then onto clockwise ring 202, therefore looping the OSC back at node 206 from a counterclockwise to a clockwise signal.

Similarly, the optical-electrical loopback in node 212 comprises receiving at the clockwise OSC unit of the management element 228 of node 212 the OSC 586 from the clockwise ring 202 and processing the OSC at the EMS 290 as described above in reference to FIG. 9. However, instead of transmitting the processed OSC as an egress signal on the clockwise ring 202 from node 212, the processed OSC is transmitted from the EMS 290 to the counterclockwise OSC unit and then to counterclockwise ring 204, therefore looping the OSC back at node 212 from a clockwise to a counterclockwise signal. In this way, each node 201 in the network 200 continues to receive the OSC from each other node 201 in the network 200. The optical-electrical loopback 582 may be used during normal operation and may be used when the OSC signal is transmitted in-band or other embodiment which the OSC signal passes through the ring switches 214. For example, in FIG. 14, if a ring switch 214 in the counterclockwise transport element 220 of the node 208 and a ring switch 214 in the clockwise element 222 have cross positions shown in FIG. 13, optical-electrical loopbacks may be deployed from clockwise to counterclockwise in the node 208 and from counterclockwise to clockwise in the node 220. In this embodiment, the OSC flow procedure is the same in both the normal and the protection (fiber cut). Thus, programming and control of the network 200 is simplified.

Figure 18:
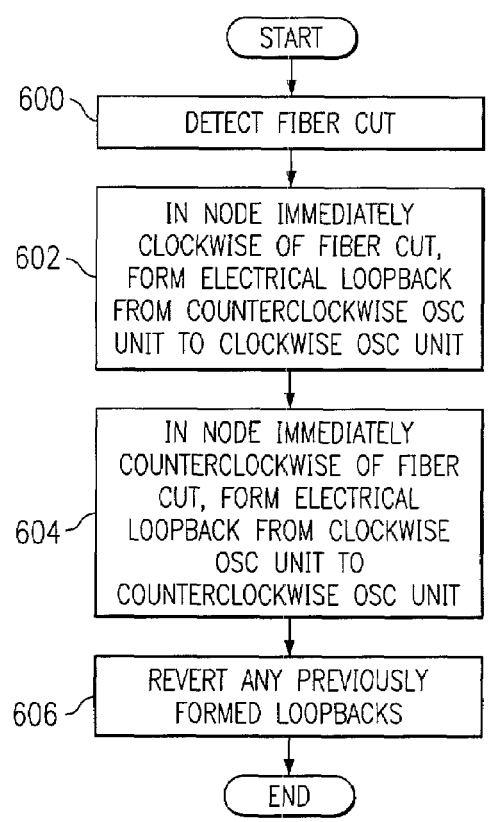
FIG. 18 is a flow diagram illustrating a method for OSC protection switching in the optical network of FIG. 8 in accordance with one embodiment of the present invention.

FIG. 18 illustrates a method for OSC protection switching in an optical network in accordance with one embodiment of the present invention. In this embodiment, protection switching is implemented in response to a fiber cut. However, it will be understood that OSC protection switching may be implemented in response to other types of failures and may be implemented in conjunction with light path protection switching.

Referring to FIG. 18, the method begins at step 600 with the detection by the NMS 292 of a fiber cut 580 in a span of a ring 202 or 204 of the optical network 200. The NMS 292 may detect the failure based on OSC and/or other signals from EMS 290 of the nodes 201.

At step 602, the NMS 292 issues a command to the EMS 290 in the node 201 immediately clockwise of the cut 580 to form an electrical loopback from the counterclockwise OSC unit to the clockwise OSC unit, thus creating, as described above, an optical-electrical loopback of the OSC from the counterclockwise ring 204 to the clockwise ring 202. The EMS 290 in the node 206 may detect the fiber cut 580 and execute this electrical loopback without the command from NMS 292.

At step 604, the NMS 292 issues a command to the EMS 290 in the node 201 immediately counterclockwise of the cut to form an electrical loopback from the clockwise OSC unit to the counterclockwise OSC unit, thus creating, as described above, an optical-electrical loopback of the OSC from the clockwise ring 202 to the counterclockwise ring 204. It will be understood that in this and other forms of protection switching, the NMS 292 may itself directly control devices in the nodes 201, may otherwise communicate with the devices to provide protection switching and/or the managing elements 228 of the nodes 201 may communicate among themselves to provide the functionality of the NMS 292.

At step 606, any other nodes 201 containing loopbacks that may have been previously formed are reverted to a non-loopbacked state. If the OSC optical-electrical loopback procedure is deployed in nodes which have the ring switch with cross position, the reverting is not required. In this way, OSC data may continue to be transmitted by and received and processed at each node 201 in the network 200. After completion of the method, the fiber cut 580 may be repaired and tested. Also as above, after repair of the fiber cut 580, there is no need to revert the network 200 to its pre-switch state.

Figure 19:
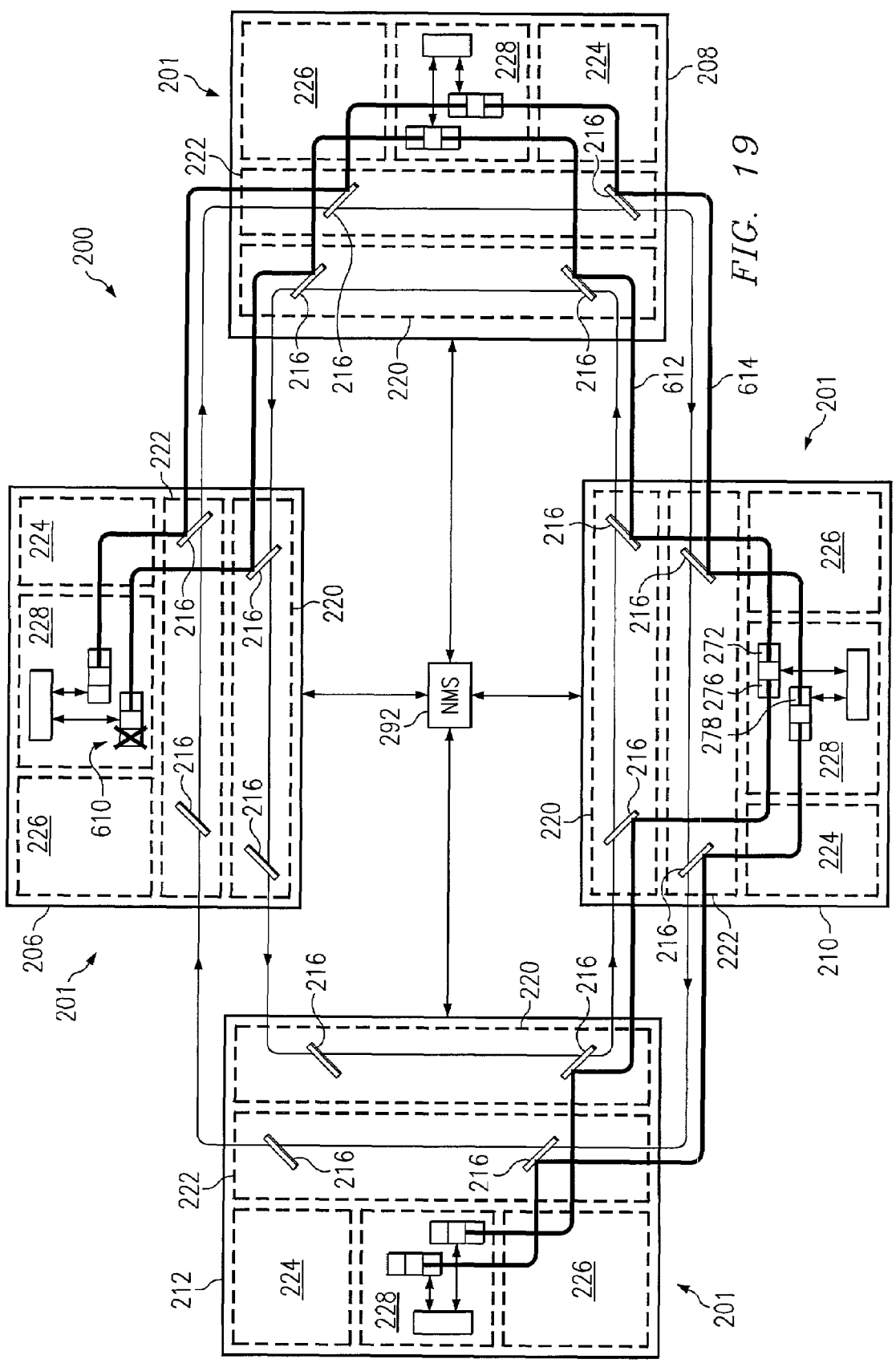
FIG. 19 is a block diagram illustrating OSC protection in the optical network of FIG. 8 in response to an OSC equipment failure in accordance with one embodiment of the present invention.

FIG. 19 illustrates OSC protection switching in the network 200 in response to an OSC equipment failure in accordance with one embodiment of the present invention. In this embodiment, protection switching is implemented for failure of an OSC sender. Failure of an OSC filter 216 or an OSC receiver 276 or 278 may necessitate similar protection switching so that each node 201 may continue to be serviced by OSC data even in the event of an equipment failure.

Referring to FIG. 19, counterclockwise OSC sender 281 of node 206 is detected as having failed. In a particular exemplary embodiment, a failure of an OSC optical sender 272 or 281 or an OSC optical receiver 276 or 278 may be detected by the NMS 292 based on an LOL alarm for the optical receiver or a downstream optical receiver with or without another failure alarm. For example, an equipment alarm for the optical sender 281 in the counterclockwise OSC unit of the managing element 282 of node 206 would indicate a failure 610 of that optical sender. In response, the NMS 292 or EMS 290 in the node 206 may loopback counterclockwise OSC 612 to clockwise OSC at node 206. At node 212, the NMS 292 loopbacks the clockwise OSC 614 to the counterclockwise OSC. Any previous loopbacks in nodes 208 and/or 210 are broken and the information sent through the nodes.

After protection switching, the failed optical sender 281 may be replaced and thereafter tested using clockwise OSC. After confirming operation of the replaced optical sender 281, the network 200 may continue to operate in its present state or may revert to the initial OSC state. As previously discussed, for a fiber cut between nodes 206 and 210 the same procedure may be followed with the fiber cut repaired and tested.

Figure 20:
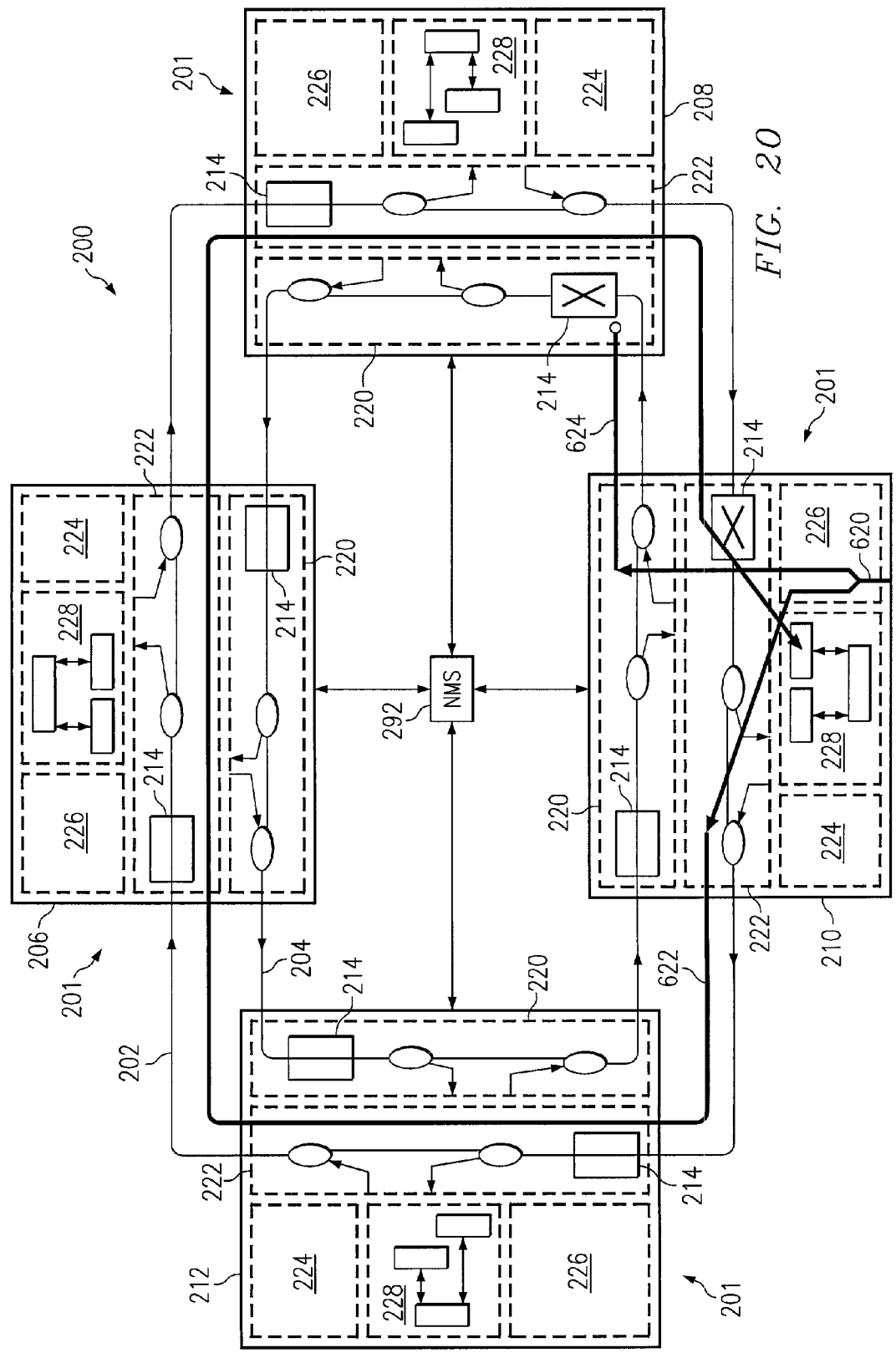
FIG. 20 is a block diagram illustrating loopback testing of a light path in the optical network of FIG. 8 in accordance with one embodiment of the present invention.
Figure 21:
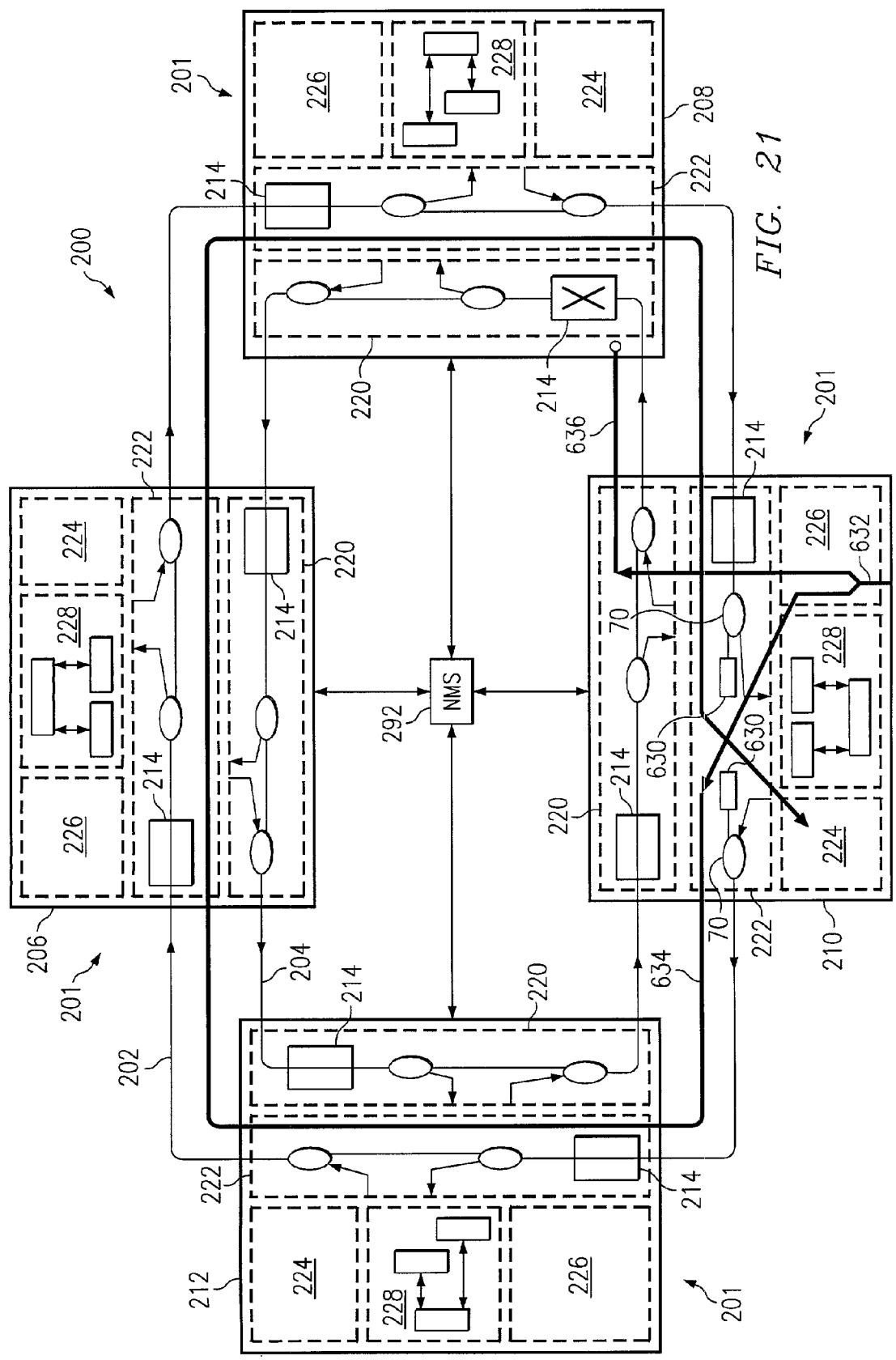
FIG. 21 is a block diagram illustrating loopback testing of a light path in the optical network of FIG. 8 in accordance with another embodiment of the present invention.
Figure 22:
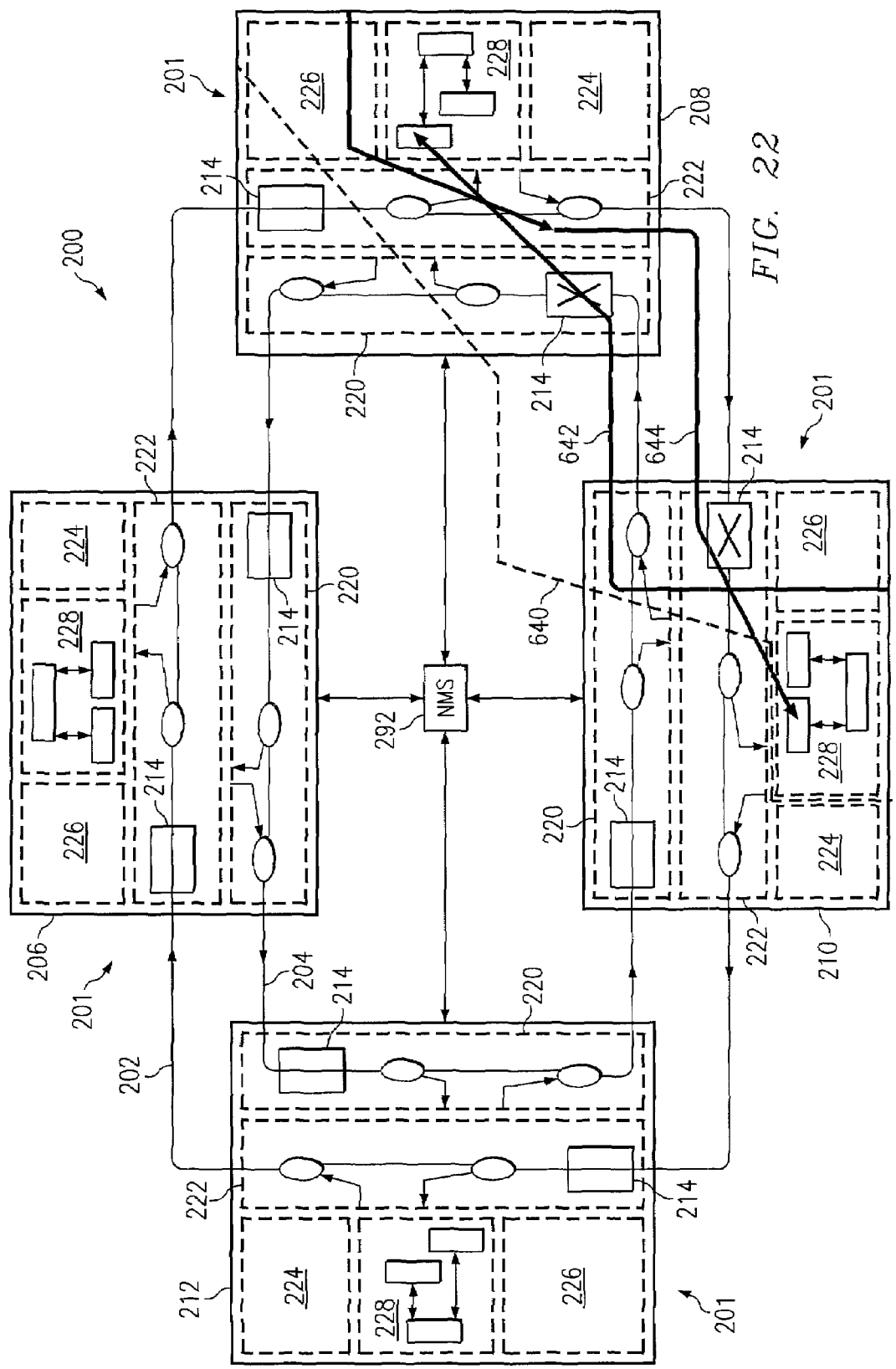
FIG. 22 is a block diagram illustrating localized area testing in the optical network of FIG. 8 in accordance with one embodiment of the present invention.

FIGS. 20–22 illustrate loopback and localized testing in optical network 200 in accordance with various embodiments of the present invention. Using the loopback and localized testing, sections of the rings 202 and 204 and devices within those sections may be tested to determine faults and failures and/or to confirm proper operation of equipment.

FIG. 20 illustrates optical loopback testing of a light path in the optical network 200 in accordance with one embodiment of the present invention. In this embodiment, the ring switches 214 are each 2×2 switches connectable to OSAs through connections 250 and 254. A test signal may be fed into the networks 202 and 204 through 248 and 252 of the 2×2 switch with cross position. The OSAs may analyze received signals and communicate the signals or information about the signals to EMS 290 and/or NMS 292.

Referring to FIG. 20, the network 200 is operating with the counterclockwise ring switch 246 crossed in node 210 and the counterclockwise ring switch 244 crossed in node 208. In this embodiment, test signal 620 may be inserted into the network 200 at the combining element 226 of node 210 for transmission on light path 622 of the clockwise ring 202 and on light path 624 of counterclockwise ring 204. In another embodiment, the test signal may be inserted from the port 256 of the 2×2 switch 240. Thus, testing may be performed in and/or from a node with no transmitters.

In particular, light path 624 is added to the counterclockwise ring 204 by counterclockwise transport element 220. On the counterclockwise ring 204, the light path 624 is transmitted to node 208 where it is terminated at crossed ring switch 214 of the counterclockwise transport element 220. In the clockwise direction, light path 622 is added to the clockwise ring 202 by clockwise transport element 222. On the clockwise ring 202, light path 622 is transmitted to and through nodes 212, 206 and 208 before returning to node 210. At node 210, light path 622 on clockwise ring 204 is terminated on the ring by ring switch 214 of the clockwise transport element 222 but is passed to an OSA via connector 254. The OSA 254 analyzes the received signal and passes the results and/or the signal to the managing element 228. Thus, the light path of ring 204 from node 210 to node 212, to node 206, and to node 208 may be tested. In a similar fashion, other light paths may be tested by opening a ring switch 214 at other nodes 201 such that for example, the returning signal is passed through a crossed switch to an OSA for analysis.

FIG. 21 illustrates loopback testing of a light path in the optical network 200 in accordance with another embodiment of the present invention. In this embodiment, the ring switches 214 may be two-way switches as well as 2×2 switches.

Referring to FIG. 21, the clockwise ring 202 is opened at node 210 between the clockwise couplers 70. The opening 630, corresponding to 230 in FIG. 9, may be accomplished by physically separating the optical fiber at a point between the clockwise couplers 70, with a two position switch or by any other methods to open the ring 202. As a result, the ring switch 214 in the clockwise transport element 222 of node 210 may remain in a closed, or through position as traffic is terminated by the opening 630.

Test signal 632 is added to the network 200 at combining element 226 of node 210 for transmission on light path 634 of the clockwise ring 202 and on light path 636 of counterclockwise ring 204. In particular, light path 636 is added to counterclockwise ring 204 by counterclockwise transport element 220. On the counterclockwise ring 204, light path 636 is transmitted to node 208 where it is terminated by ring switch 214 of the counterclockwise transport element 220. In the clockwise direction, light path 634 is added to the clockwise ring 202 by clockwise transport element 222. On the clockwise ring 202, light path 634 is transmitted to and through nodes 212, 206 and 208 before returning to node 210. At node 210, the ring switch 214 of clockwise transport element 222 is closed to allow ingress traffic to proceed to the drop coupler 70 before being terminated on the ring 202 by the opening 630. Because the opening 630 of the ring 202 occurs at a point after the ingress signal in node 210 has been dropped by the drop coupler 70 of the clockwise transport element 222 of node 210, the lightpath 634, unlike the example shown in FIG. 20, is received by the distributing element 224 and may be passed to EMS 290 and/or NMS 292. In a similar fashion, other light paths may be tested by opening a ring 202 or 204 between the couplers 70 of other nodes 201.

FIG. 22 illustrates localized area testing in the optical network 200 in accordance with one embodiment of the present invention. This embodiment, the 2×2 switches and the OSAs are used to route and monitor test signals.

Referring to FIG. 22, a localized area 640 may be defined as necessary for light path or component testing, repair, or replacement. In the illustrated embodiment, the localized area 640 extends from a portion of the combining and transport elements 220, 222, 226 and 228 of node 210 across the clockwise and counterclockwise rings 202 and 204 to the distributing 224 and managing elements 228 of node 208 as well as a portion of the transport and combining elements 220, 222 and 226 of node 208. To isolate the elements of the localized area 640 from the rest of the in-service network, the clockwise ring switch 214 of node 210 and the counterclockwise ring switch 214 of node 208 are opened. The localized area thus includes the opposite parts of two neighboring nodes such that, in one embodiment, a localized area 640 may be defined covering any device of any node in the network 200.

The localized area 640 may be tested with a first light path 642 added to the network 200 by the combining element 226 of node 210. Light path 642 is added to the counterclockwise ring 204 by the counterclockwise transport element 220 and travels on the counterclockwise ring 204 to node 208 where it is dropped from the ring by counterclockwise ring switch 214 to an attached OSA and thus to the managing element 228 in the node 208. Conversely, a second light path 644 is added to the network 200 by combining element 226 of node 208 and added to the clockwise ring 202 by the clockwise transport element 222. Light path 644 travels to node 210 on the clockwise ring 204 and is terminated from the ring by clockwise ring switch 214 which drops the light path to a connected OSA and thus to the managing element 228 in the node 210. Thus, testing of replacement or repair components within localized area 640 may be conducted without interfering with the in-service network.

Figure 23:
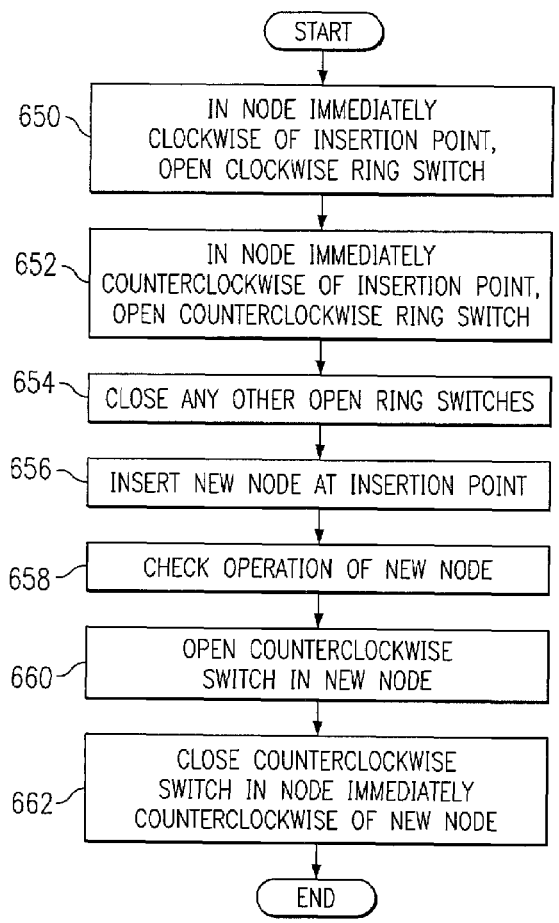
FIG. 23 is a flow diagram illustrating a method for inserting a node into the optical network of FIG. 8 in accordance with one embodiment of the present invention.

FIG. 23 illustrates a method for inserting a node 201 into the optical network 200 in accordance with one embodiment of the present invention. Node insertion may take full advantage of the scalability in the design of network 200. Other suitable elements may be similarly inserted between the existing nodes 201 of the optical network 200.

Referring to FIG. 23, the method begins with step 650 wherein the clockwise ring switch 214 is opened in the node 201 immediately clockwise of the insertion point for the new node. Proceeding to step 652, the counterclockwise ring switch 214 is opened in the node 201 immediately counterclockwise of the insertion point. At step 654, any other open ring switches 214 are closed. Thus, the nodes 201 of the network 200 may each communicate with each other without communicating across a span in which the new node is to be added.

Proceeding to step 656, the new node is inserted at the insertion point. Such insertion may require the physical separation of the clockwise and counterclockwise optical ring fibers. At step 658, the operation of amplifiers, switches, and other elements of the new node may be checked and tested.

Proceeding to step 660, the counterclockwise switch 214 in the new node is opened. At step 662, the counterclockwise switch 214 is closed in the node 201 immediately counterclockwise of the new node. In this way, the counterclockwise ring 204 is open at the new node and the clockwise ring 202 is open at the node 201 immediately clockwise of the new node. In another embodiment, the clockwise switch 214 in the new node may be opened and the clockwise switch 214 in the node immediately clockwise of the new node closed.

Figure 24:
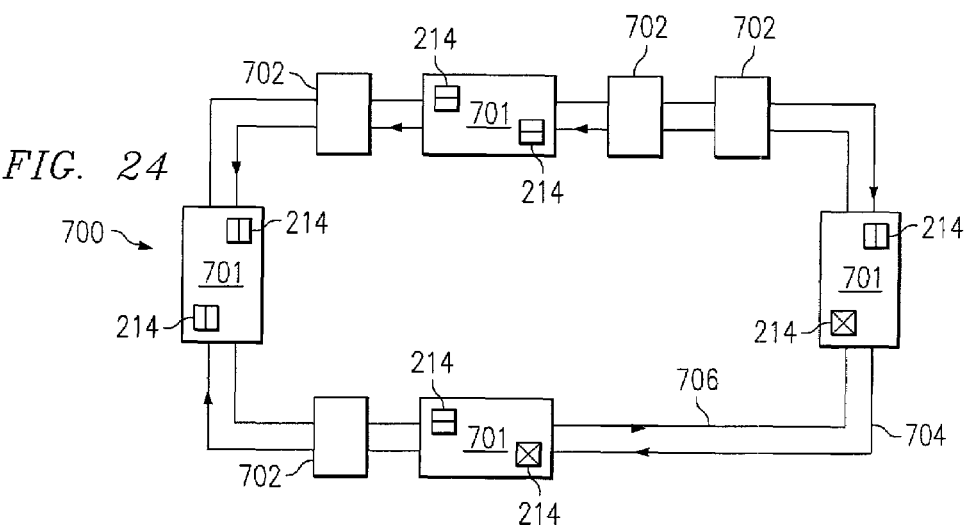
FIG. 24 is a block diagram illustrating the optical network of FIG. 8 with passive nodes in accordance with one embodiment of the present invention.

FIG. 24 illustrates an optical network 700 with a combination of active nodes 701 and passive nodes 702 connected by clockwise and counterclockwise optical rings 704 and 706 in accordance with one embodiment of the present invention. In this embodiment, the passive nodes 702 may be passive in that they include no switches and/or no switches connected in the optical rings 704 and/or 706 while the active nodes 701 may be the nodes 201 of network 200 or other nodes including optical switches 214 in the transport elements or otherwise connected within the optical rings 704 or 706.

The passive nodes 702 may be of a simpler and less expensive design. In this way, the addition of the passive node 702 may allow for additional add/drop nodes in the network 700 while minimizing the additional costs associated with the additional nodes. Because the nodes 702 are passive, however, they are not included in protection switching and may be isolated when the ring switches 214 in the neighboring nodes are crossed or otherwise open. Thus, in one embodiment, the passive nodes 702 may be used for low priority traffic. The passive nodes 702, as well as other nodes, may be add only nodes, drop only nodes or add/drop nodes.

Figure 25:
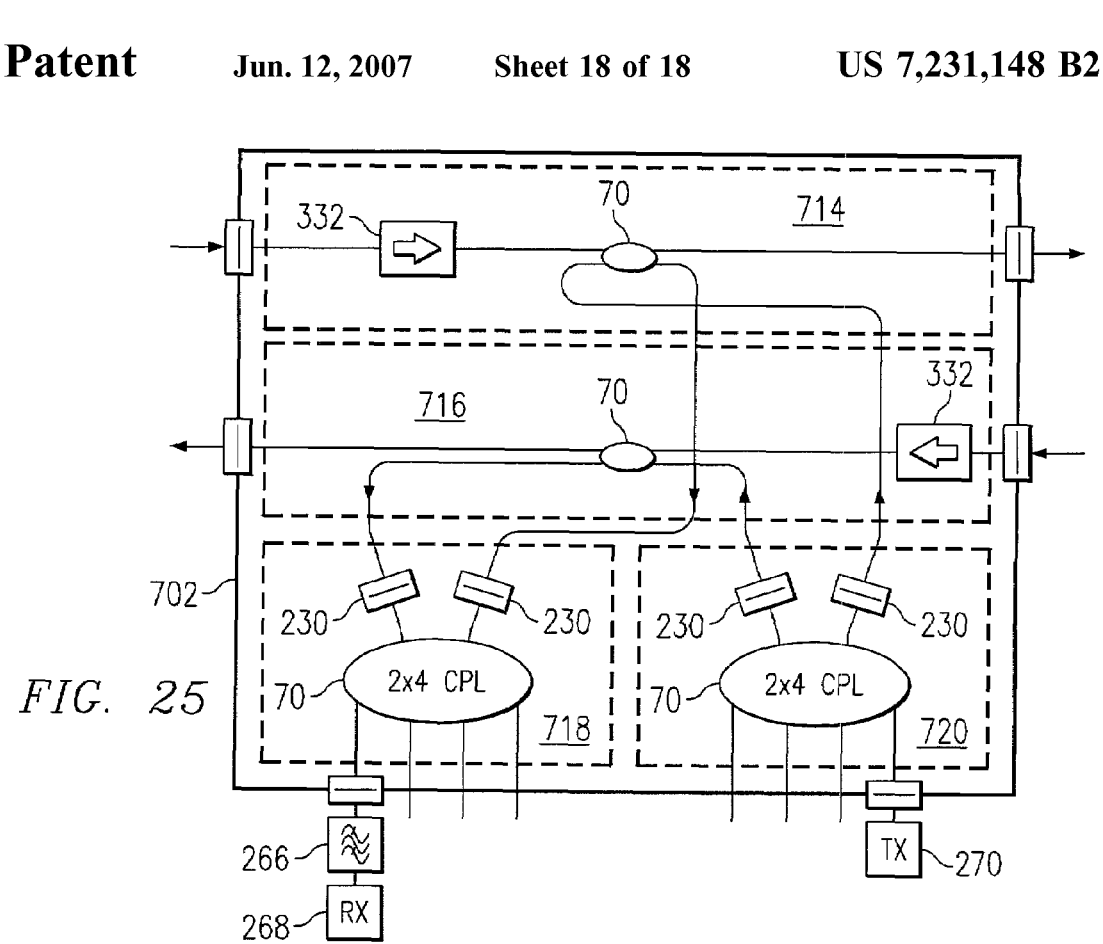
FIG. 25 is a block diagram illustrating details of the passive node of FIG. 24 in accordance with one embodiment of the present invention.

FIG. 25 illustrates details of the passive node 702 of the optical network 700 in accordance with one embodiment of the present invention. In this embodiment, the passive node 702 includes an integrated add/drop coupler.

Referring to FIG. 25, the node 702 comprises a counterclockwise transport element 714, a clockwise transport element 716, a distributing element 718, and a combining element 720. The transport element 714 and 716 and the distributing and combining element 718 and 720 comprise passive couplers 70. The passive coupler 70 of the transport elements are 2×2 splitters. Isolators in the ingress side of the transport elements may avoid the interference due to multiple-reflection. The passive couplers 70 of the distributing and combining elements 718 and 720 are 2×4 splitters. The output leads of the coupler 70 of the distributing element feeds into filters 266 and receiver 268, described previously in reference to FIG. 9. Transmitters 270, also described in reference to FIG. 9, feed into the coupler 70 of the combining element 720. Being comprised, in one embodiment, of entirely passive components, the passive node 702 provides for flexible add/drop capability while being simple and relatively inexpensive.

Figure 26:
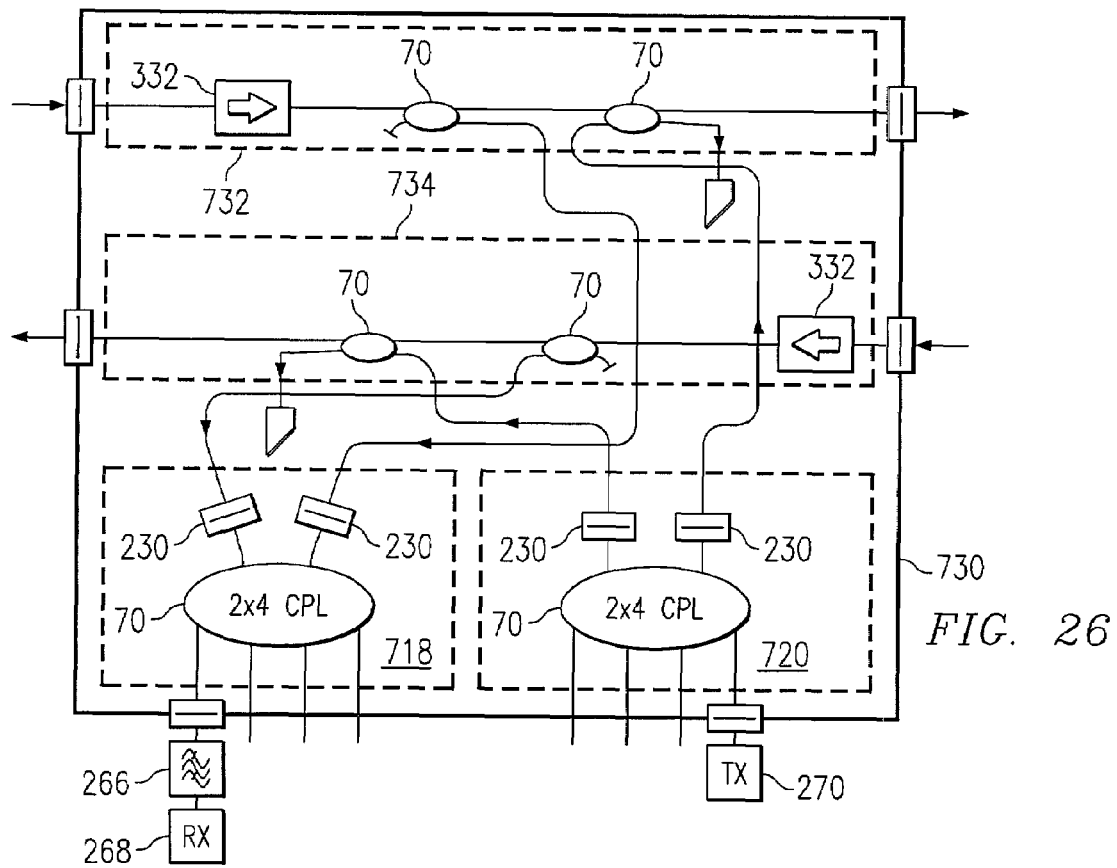
FIG. 26 is a block diagram illustrating details of the passive node of FIG. 24 in accordance with another embodiment of the present invention.

FIG. 26 is a block diagram illustrating details of a passive node of the network 700 in accordance with another embodiment of the invention. In this embodiment, node 702 uses discreet add and drop couplers.

Referring to FIG. 26, the passive node 730 comprises distributing element 718, combining element 720, filter 266, receiver 268, and transmitter 270 as described above in reference to FIG. 25. However, counterclockwise transport element 732 and clockwise transport element 734 each comprise a pair of transport couplers in addition to isolators. In this embodiment, the splitting ratio of the drop coupler is independently determined from the splitting ratio of the add coupler. As described above in reference to FIG. 4, an arrangement wherein the transport elements comprise a plurality of couplers each having one or a portion of the combiner or splitter elements may reduce channel interference by dropping local traffic from a ring 704 or 706 before adding the local traffic to the rings.

Although the present invention has been described with several embodiments, various changes and modifications may be suggested to one skilled in the art. It is intended that the present invention encompass such changes and modifications as fall within the scope of the appended claims.

What is claimed is:

1. A node for an optical network, comprising:
a first transport element operable to be coupled to a first optical ring transporting traffic in a first direction and a second transport element operable to be coupled to a second optical ring transporting traffic in a second disparate direction, the first and second transport elements each comprising an optical combiner element, an optical splitter element and a ring switch;
each optical combiner element disposed on an egress side of the associated ring switch and operable to passively combine an add signal comprising local add traffic and a first transport signal comprising ingress traffic from the associated optical ring to generate a second transport signal comprising egress traffic for transmission on the associated optical ring; and
each optical splitter element coupled to an associated optical combiner element, the optical splitter element operable to passively split a third transport signal comprising the ingress traffic to generate a drop signal comprising local drop traffic and a fourth transport signal comprising the ingress traffic.

2. The node of claim 1, further comprising an optical splitter including the optical splitter element and the combiner element integrated together wherein the third transport signal and second transport signal are intermediate signals in the optical splitter.

3. The node of claim 1, further comprising the optical splitter element and the optical combiner element each comprising a distinct optical splitter.

4. The node of claim 1, further comprising each optical splitter element coupled to an ingress portion of the associated optical ring and each optical combiner element coupled to the associated optical splitter element and to an egress portion of the associated optical ring, wherein the fourth and first transport signals are a same passthrough signal of the node.

5. An optical network, comprising:
a plurality of nodes;
a first ring and a second ring connecting the nodes, the first ring operable to transport traffic in a first direction and the second ring operable to transport traffic in a second, disparate direction;
the nodes each including a first transport element coupled to the first ring and a second transport element coupled to the second ring;
the transport elements each comprising an optical splitter unit operable to add local traffic to the coupled ring and to drop local traffic from the coupled ring; and
a plurality of optical switches disposed and distributed in each ring, the optical switches each operable to open a connected ring at a point of the switch on an ingress side of the optical splitter unit, wherein the optical switches are each disposed between optical splitter units of all neighboring nodes.

6. The optical network of claim 5, wherein the optical switches are in the transport elements of the nodes.

7. The optical network of claim 5, the nodes each further comprising a combining element operable to generate from a plurality of local ingress signals an add signal including the local add traffic.

8. The optical network of claim 7, wherein the combining element comprises a combining amplifier.

9. The optical network of claim 8, wherein the combining amplifier comprises an optical splitter operable to passively generate the add signal.

10. The optical network of claim 7, the combining element comprising a switch operable to forward to a coupled transport element or to terminate a signal comprising the local add traffic.

11. The optical network of claim 7, the combining element comprising an amplifier operable to amplify a signal comprising the local add traffic.

12. The optical network of claim 5, the nodes each further comprising a distributing element operable to receive a drop signal comprising the local drop traffic and to recover the local drop traffic.

13. The optical network of claim 12, wherein the distributing element comprises a distributing amplifier.

14. The optical network of claim 13, the distributing amplifier comprising an optical splitter operable to passively generate a plurality of discrete signals from which the local drop traffic is recovered.

15. The optical network of claim 12, wherein the distributing element comprises an arrayed waveguide.

16. The optical network of claim 12, the distributing element comprising an amplifier operable to amplify a signal comprising the local drop traffic.

17. The optical network of claim 5, the nodes each further comprising an element management system operable to implement protection switching for the node.

18. The optical network of claim 17, the element management system operable to control the optical switches of the node to implement the protection switching.

19. The optical network of claim 17, further comprising a network management system operable to communicate with the element management systems of the nodes and to implement protection switching for the network through the element management systems of the nodes.

20. The optical network of claim 19, the network management system operable to selectively actuate corresponding sets of the optical switches through the element management systems to implement protection switching in response to at least a network failure.

21. The optical network of claim 20, wherein the network failure comprises a ring cut.

22. The optical network of claim 20, wherein the network failure comprises a component failure in a node.

23. The optical network of claim 20, wherein the corresponding sets comprise optical switches upstream of a point of the network failure.

24. The optical network of claim 5, wherein each optical switch is part of a set of optical switches including the optical switch and an adjacent redundant optical switch operable to perform the operation of the optical switch in case of failure of the optical switch.

25. The optical network of claim 5, wherein the optical splitter unit comprises a first optical splitter operable to drop local traffic from the coupled ring and a second optical splitter operable to add local traffic to the coupled ring.

26. The optical network of claim 5, the transport elements each comprising an amplifier operable to amplify a transport signal.

27. The optical network of claim 5, the first and second transport elements each comprising a discrete card in a card shelf of the node.

28. The optical network of claim 5, where each of the plurality of nodes in the optical network are configured substantially the same.

* * * * *